United States Patent
Alland et al.

(10) Patent No.: US 9,869,762 B1
(45) Date of Patent: Jan. 16, 2018

(54) VIRTUAL RADAR CONFIGURATION FOR 2D ARRAY

(71) Applicant: UHNDER, INC., Austin, TX (US)

(72) Inventors: Stephen W. Alland, Newbury Park, CA (US); Jean P. Bordes, St. Charles, MO (US); Curtis Davis, St. Louis, MO (US); Murtaza Ali, Cedar Park, TX (US)

(73) Assignee: UHNDER, INC., Austin, TX (US)

( * ) Notice: Subject to any disclaimer, the term of this patent is extended or adjusted under 35 U.S.C. 154(b) by 0 days.

(21) Appl. No.: 15/705,627

(22) Filed: Sep. 15, 2017

Related U.S. Application Data

(60) Provisional application No. 62/395,583, filed on Sep. 16, 2016.

(51) Int. Cl.
  *G01S 7/03* (2006.01)
  *G01S 13/42* (2006.01)
  (Continued)

(52) U.S. Cl.
  CPC .............. *G01S 13/42* (2013.01); *G01S 7/282* (2013.01); *G01S 2013/9321* (2013.01); *G01S 2013/9389* (2013.01)

(58) Field of Classification Search
  CPC ......... G01S 7/03; G01S 7/2813; H01Q 21/08; H01Q 3/2611; H01Q 3/2635
  (Continued)

(56) References Cited

U.S. PATENT DOCUMENTS

| 1,882,128 A | 10/1932 | Fearing |
| 3,374,478 A | 3/1968 | Blau |

(Continued)

FOREIGN PATENT DOCUMENTS

| EP | 0725480 | 11/2011 |
| EP | 2374217 | 4/2013 |

(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Timothy A Brainard
(74) *Attorney, Agent, or Firm* — Gardner, Linn, Burkhart & Flory

(57) ABSTRACT

A radar sensing system for a vehicle includes a plurality of transmitters, a plurality of receivers, and a plurality of receive and transmit antennas. The plurality of transmitters are configured for installation and use on a vehicle, and operable to transmit radio signals. The plurality of receivers are configured for installation and use on the vehicle, and operable to receive radio signals which include transmitted radio signals reflected from objects in the environment. The plurality of receive antennas and the plurality of transmit antennas are arranged in a selected MIMO configuration to provide a quantity of receive antennas and transmit antennas for a desired level of two-dimensional angle capability for a given board size.

29 Claims, 28 Drawing Sheets

(51) Int. Cl.
*G01S 7/282* (2006.01)
*G01S 13/93* (2006.01)

(58) Field of Classification Search
USPC ........................................................ 342/107
See application file for complete search history.

(56) References Cited

U.S. PATENT DOCUMENTS

| | | |
|---|---|---|
| 3,735,398 A | 5/1973 | Ross |
| 3,750,169 A | 7/1973 | Strenglein |
| 3,896,434 A | 7/1975 | Sirven |
| 4,078,234 A | 3/1978 | Fishbein et al. |
| 4,176,351 A | 11/1979 | De Vita et al. |
| 4,566,010 A | 1/1986 | Collins |
| 4,939,685 A | 7/1990 | Feintuch |
| 5,001,486 A | 3/1991 | Bächtiger |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,379,322 A | 1/1995 | Kosaka et al. |
| 5,508,706 A | 4/1996 | Tsou et al. |
| 5,657,023 A | 8/1997 | Lewis et al. |
| 5,712,640 A | 1/1998 | Andou et al. |
| 5,724,041 A | 3/1998 | Inoue et al. |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,288,672 B1 | 9/2001 | Asano et al. |
| 6,307,622 B1 | 10/2001 | Lewis |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,714,956 B1 | 3/2004 | Liu et al. |
| 6,747,595 B2 | 6/2004 | Hirabe |
| 6,768,391 B1 | 7/2004 | Dent et al. |
| 6,975,246 B1 | 12/2005 | Trudeau |
| 7,119,739 B1 | 10/2006 | Struckman |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,154,436 B2 | 4/2012 | Szajnowski |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 9,121,943 B2 | 9/2015 | Stirlin-Gallacher et al. |
| 9,239,378 B2 | 1/2016 | Kishigami et al. |
| 9,239,379 B2 | 1/2016 | Burgio et al. |
| 9,282,945 B2 | 3/2016 | Smith et al. |
| 9,335,402 B2 | 5/2016 | Maeno et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,753,121 B1 | 9/2017 | Davis |
| 9,753,132 B1 | 9/2017 | Bordes et al. |
| 9,772,397 B1 | 9/2017 | Bordes et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0138802 A1 | 7/2004 | Kuragaki et al. |
| 2005/0069162 A1 | 3/2005 | Haykin |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0109175 A1 | 5/2007 | Fukuda |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0279303 A1 | 12/2007 | Schoebel |
| 2008/0208472 A1 | 8/2008 | Morcom |
| 2008/0272955 A1 | 11/2008 | Yonak et al. |
| 2009/0015459 A1 | 1/2009 | Mahler et al. |
| 2009/0015464 A1 | 1/2009 | Fukuda |
| 2009/0051581 A1 | 2/2009 | Hatono |

(56) References Cited

U.S. PATENT DOCUMENTS

| | | |
|---|---|---|
| 2009/0073025 A1 | 3/2009 | Inoue et al. |
| 2009/0079617 A1 | 3/2009 | Shirakawa et al. |
| 2009/0085827 A1 | 4/2009 | Orime et al. |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0267822 A1 | 10/2009 | Shinoda et al. |
| 2009/0289831 A1 | 11/2009 | Akita |
| 2009/0295623 A1 | 12/2009 | Falk |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0277359 A1 | 11/2010 | Ando |
| 2011/0006944 A1 | 1/2011 | Goldman |
| 2011/0032138 A1 | 2/2011 | Krapf |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2012/0001791 A1 | 1/2012 | Wintermantel |
| 2012/0050093 A1 | 3/2012 | Heilmann et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0257643 A1 | 10/2012 | Wu et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1 | 3/2013 | Shirakawa et al. |
| 2013/0102254 A1 | 4/2013 | Cyzs et al. |
| 2013/0113653 A1 | 5/2013 | Kishigami et al. |
| 2013/0135140 A1 | 5/2013 | Kishigami |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0111372 A1 | 4/2014 | Wu |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0285373 A1 | 9/2014 | Kuwahara et al. |
| 2014/0327566 A1 | 11/2014 | Burgio et al. |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Kuehnle |
| 2015/0226848 A1 | 8/2015 | Park |
| 2015/0229033 A1* | 8/2015 | Choi ............... G01S 7/032 342/27 |
| 2015/0234045 A1 | 8/2015 | Rosenblum |
| 2015/0247924 A1 | 9/2015 | Kishigami |
| 2015/0301172 A1 | 10/2015 | Ossowska |
| 2015/0323660 A1 | 11/2015 | Hampikian |
| 2015/0331090 A1 | 11/2015 | Jeong et al. |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1* | 3/2016 | Alcalde ............... G01S 13/4454 342/175 |
| 2016/0139254 A1 | 5/2016 | Wittenberg |
| 2016/0238694 A1 | 8/2016 | Kishigami |
| 2017/0023661 A1 | 1/2017 | Richert |

FOREIGN PATENT DOCUMENTS

| | | |
|---|---|---|
| EP | 2821808 | 7/2015 |
| FR | 2751086 | 1/1998 |
| WO | WO2015175078 | 11/2015 |
| WO | WO2015185058 | 12/2015 |
| WO | WO2016/011407 | 1/2016 |
| WO | WO2016030656 | 3/2016 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

* cited by examiner

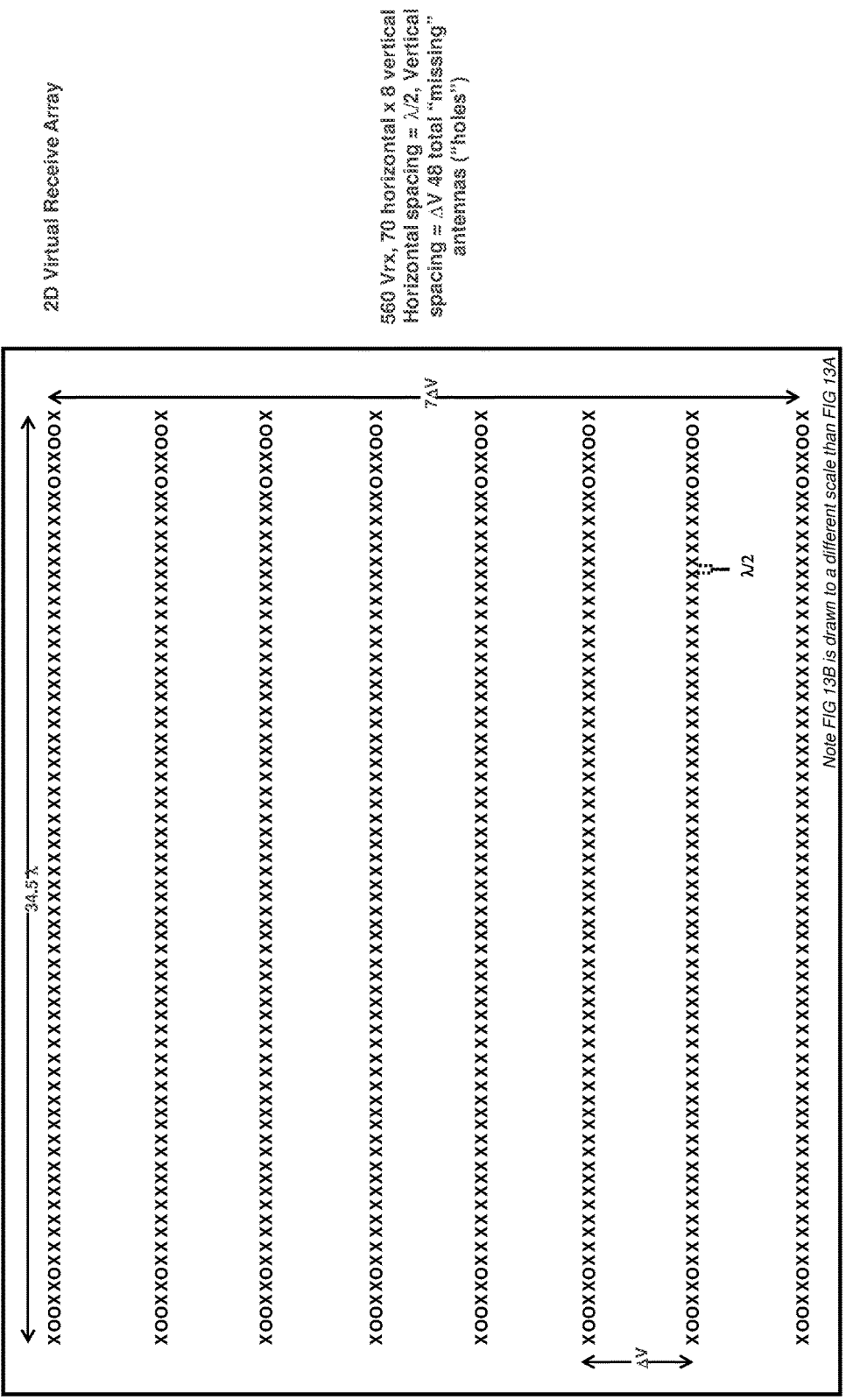

ated by the MIMO configuration of FIG. 5A;

VIRTUAL RADAR CONFIGURATION FOR 2D ARRAY

CROSS REFERENCE TO RELATED APPLICATION

The present application claims the filing benefit of U.S. provisional application Ser. No. 62/395,583, filed Sep. 16, 2016, which is hereby incorporated by reference herein in its entirety.

FIELD OF THE INVENTION

The present invention is directed to radar systems, and in particular to radar systems for vehicles.

BACKGROUND OF THE INVENTION

The use of radar to determine range and velocity of objects in an environment is important in a number of applications including automotive radar and gesture detection. A radar typically transmits a signal and listens for the reflection of the signal from objects in the environment. By comparing the transmitted radio signals with the received radio signals, a radar system can determine the distance to an object. Using Doppler processing, the velocity of an object can be determined. Using various transmitter and receiver combinations, the location (angle) of an object can also be determined.

SUMMARY OF THE INVENTION

The present invention provides multiple-input, multiple-output (MIMO) virtual array methods and a system for achieving better performance in a radar system in determining the angles of an object/target. MIMO antenna techniques offer the potential for substantial improvements in azimuth and elevation angle accuracy and resolution.

Automotive radar with MIMO technology is now entering the market place with modest improvements in angle capability, primarily in the azimuth angle dimension, with less capability in the elevation angle dimension. To support autonomous driving, substantially better capability in both azimuth and elevation will be required to detect and determine the angles of closely spaced objects and to image individual objects.

Therefore, improved MIMO antenna configurations are needed to provide the required resolution in azimuth and elevation within the constraints of the physical antenna size and performance/cost of the radio frequency (RF) and digital signal processing components. Improved MIMO antenna configurations are disclosed herein.

A radar sensing system for a vehicle in accordance with an embodiment of the present invention includes a plurality of transmitters, a plurality of receivers, and a plurality of receive antennas and transmit antennas. The plurality of transmitters is configured for installation and use on a vehicle, and operable to transmit radio signals. The plurality of receivers is configured for installation and use on the vehicle, and operable to receive radio signals that include transmitted radio signals reflected from objects in the environment. A selected antenna configuration provides a quantity of receive antennas and transmit antennas for a desired two-dimensional angle capability for a given board size.

A radar sensing system for a vehicle in accordance with an embodiment of the present invention includes a plurality of transmitters and a plurality of receivers, and a plurality of receive and transmit antennas arranged according to MIMO antenna topologies that comprise transmit and receive antennas with uniform spacing of virtual phase centers as well as sparse array configurations with non-uniform spacing of the virtual phase centers in both horizontal and vertical dimensions.

A radar sensing system for a vehicle in accordance with an embodiment of the present invention includes a plurality of transmitters and a plurality of receivers, and a plurality of receive and transmit antennas arranged according to MIMO antenna topologies that provide a virtual receive sub-array with antennas spaced by half a wavelength ($\lambda/2$) while using transmit and receive antennas spaced by greater than $\lambda/2$ through the uniform spacing of the transmit antennas by an integer multiple of $\lambda/2$ and uniform spacing of the receive antennas by a different integer multiple of $\lambda/2$.

A radar sensing system for a vehicle in accordance with an embodiment of the present invention includes a plurality of transmitters and a plurality of receivers, and a plurality of receive antennas and transmit antennas in an MIMO antenna configuration comprising one of: (i) a MIMO configuration with a minimum quantity of antennas and minimum antenna board size for a desired 2D angle capability; (ii) a MIMO configuration comprising TX antenna and/or RX antenna spacing substantially greater than half a wavelength ($\lambda/2$) and compatible with wide field of view (FOV), wherein selected TX antenna and/or RX antenna sizes are selected for enhanced detection range while still yielding a virtual uniform linear array (ULA) of $\lambda/2$ spacing with no grating lobes; (iii) a MIMO configuration comprising TX antenna and/or RX antenna spacing substantially greater than $\lambda/2$ that yields a virtual receive array with uniform phase center spacing of less than the TX or RX phase center spacing, but greater than $\lambda/2$, yet with the capability to suppress resulting grating lobes; (iv) a MIMO configuration wherein at least one of quantity, size, and spacing of TX antennas and RX antennas are selected for a desired 2D angle capability; and (v) a MIMO configuration with a selected spacing and/or layout for a desired level of azimuth and elevation capability for a given quantity of TX and RX antennas.

These and other objects, advantages, purposes and features of the present invention will become apparent upon review of the following specification in conjunction with the drawings.

BRIEF DESCRIPTION OF THE DRAWINGS

FIG. 14B is a diagram illustrating a 2D virtual receive array synthesized by the MIMO configuration of FIG. 14A in accordance with an aspect of the present invention;

DESCRIPTION OF THE PREFERRED EMBODIMENTS

The present invention will now be described with reference to the accompanying figures, wherein numbered elements in the following written description correspond to like-numbered elements in the figures.

Exemplary embodiments of the present invention accomplish better two-dimensional (2D) angle capability over the current state of the art via exemplary multiple input, multiple output (MIMO) antenna topologies in accordance with the present invention. Improvement in angle capability includes better angle resolution for more reliable detection of multiple closely spaced objects as well as better quality imaging for contour detection and identification of individual objects.

Angle resolution is known to scale linearly with the length of the MIMO virtual receiver array, which in turn depends on the number of transmit and receive antennas and their spatial distribution.

Therefore, as described herein, the present invention provides methods and a system for achieving better 2D angle performance in a radar system where a MIMO antenna configuration provides an efficient quantity of antennas and antenna board size for a given level of two-dimensional angle capability.

In an aspect of the present invention, the exemplary MIMO antenna topologies are scalable in the size and spacing of the TX and RX antennas, as well as the number of antennas, and the resulting 2D angle capability.

Figure 1:
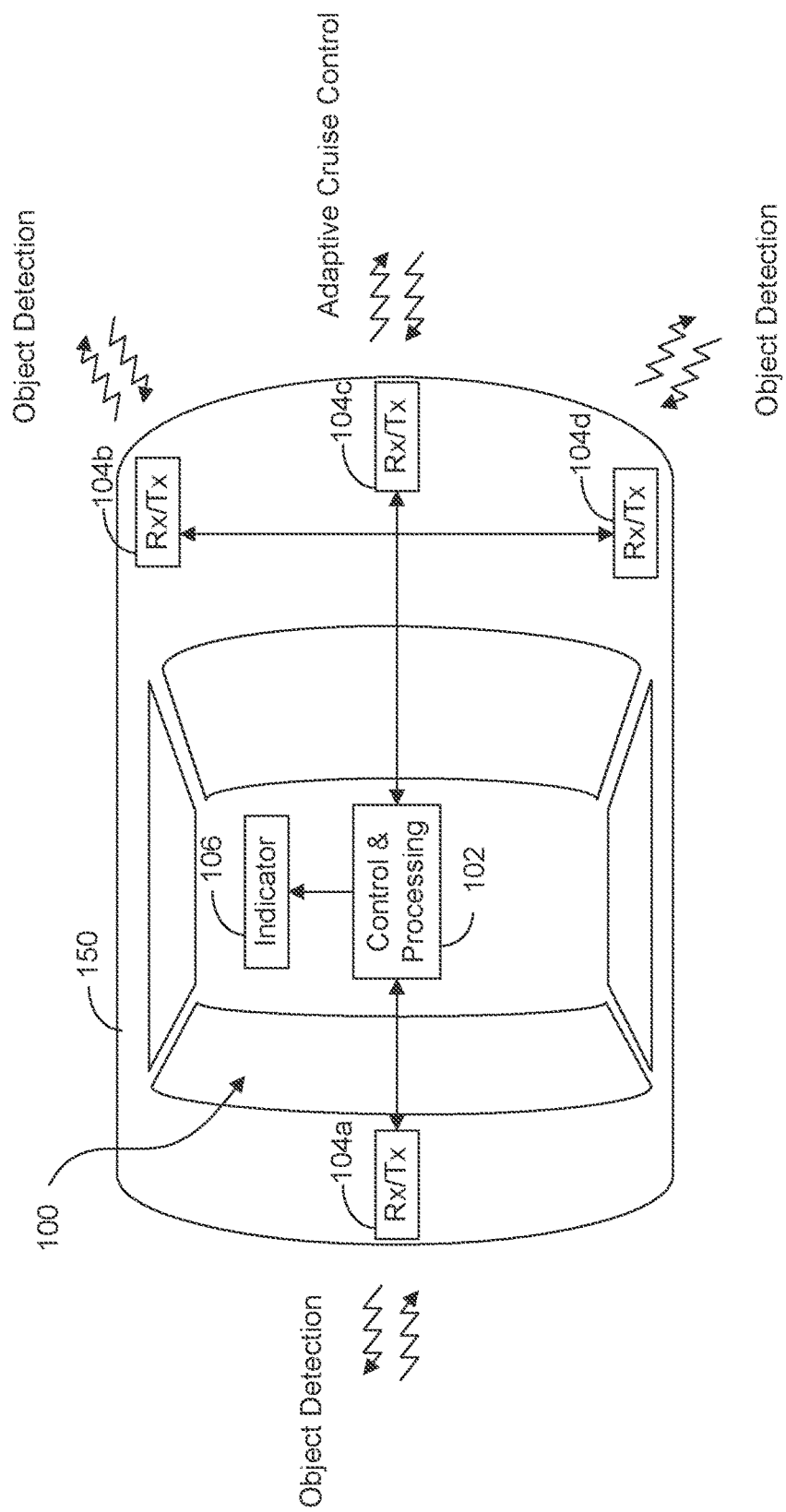
FIG. 1 is a plan view of an automobile equipped with a radar system in accordance with the present invention.

FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more receivers 104a-104d that interface with a control & processing module 102 and an indicator 106. Other configurations are also possible. For example, modules 104a-104d can be complete radar sensors, each with one or multiple transmitters and one or multiple receivers and their own individual control & processing module.

FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2A:
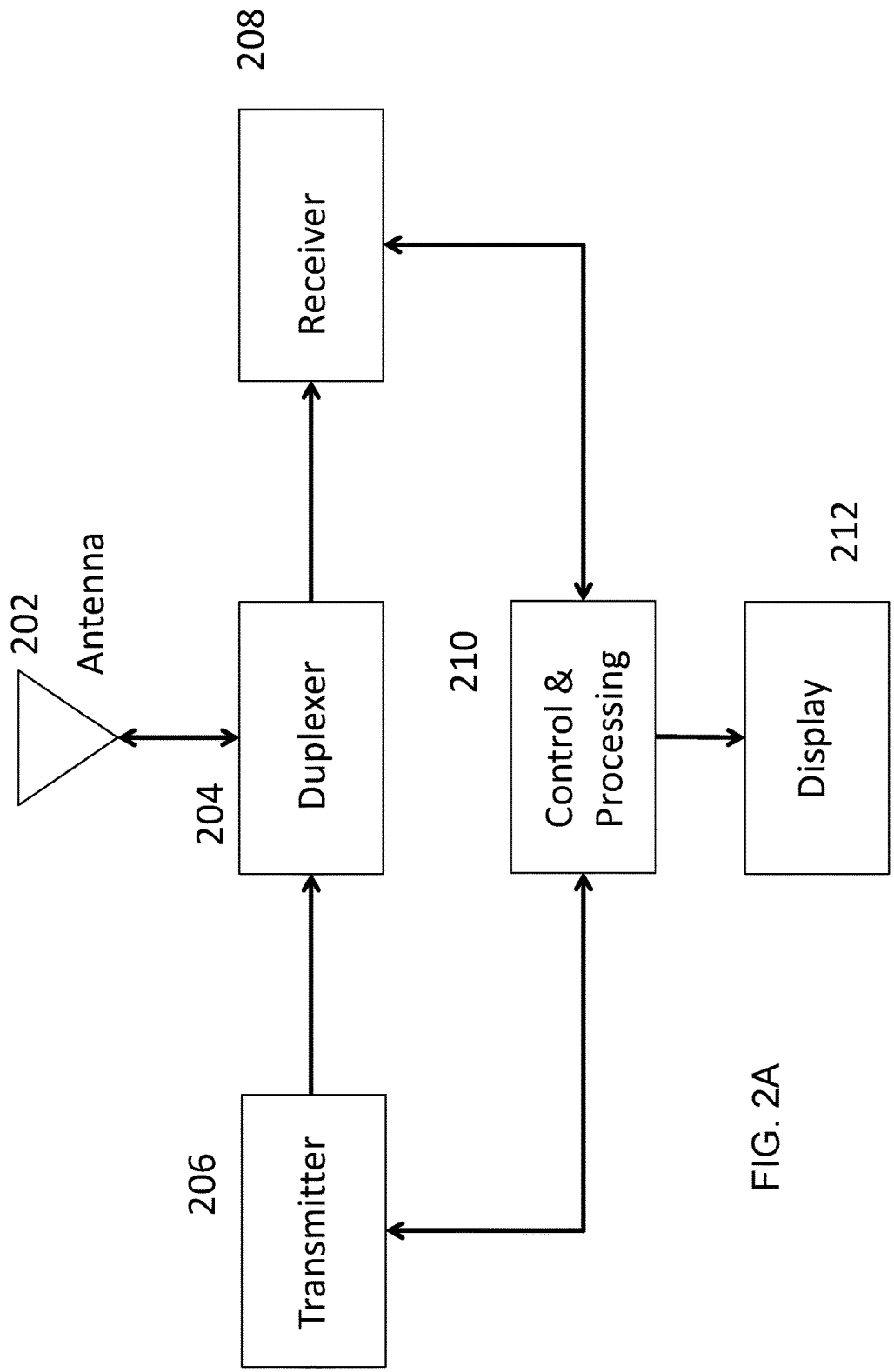
FIG. 2A and FIG. 2B are block diagrams of radar systems in accordance with the present invention.
Figure 2B:
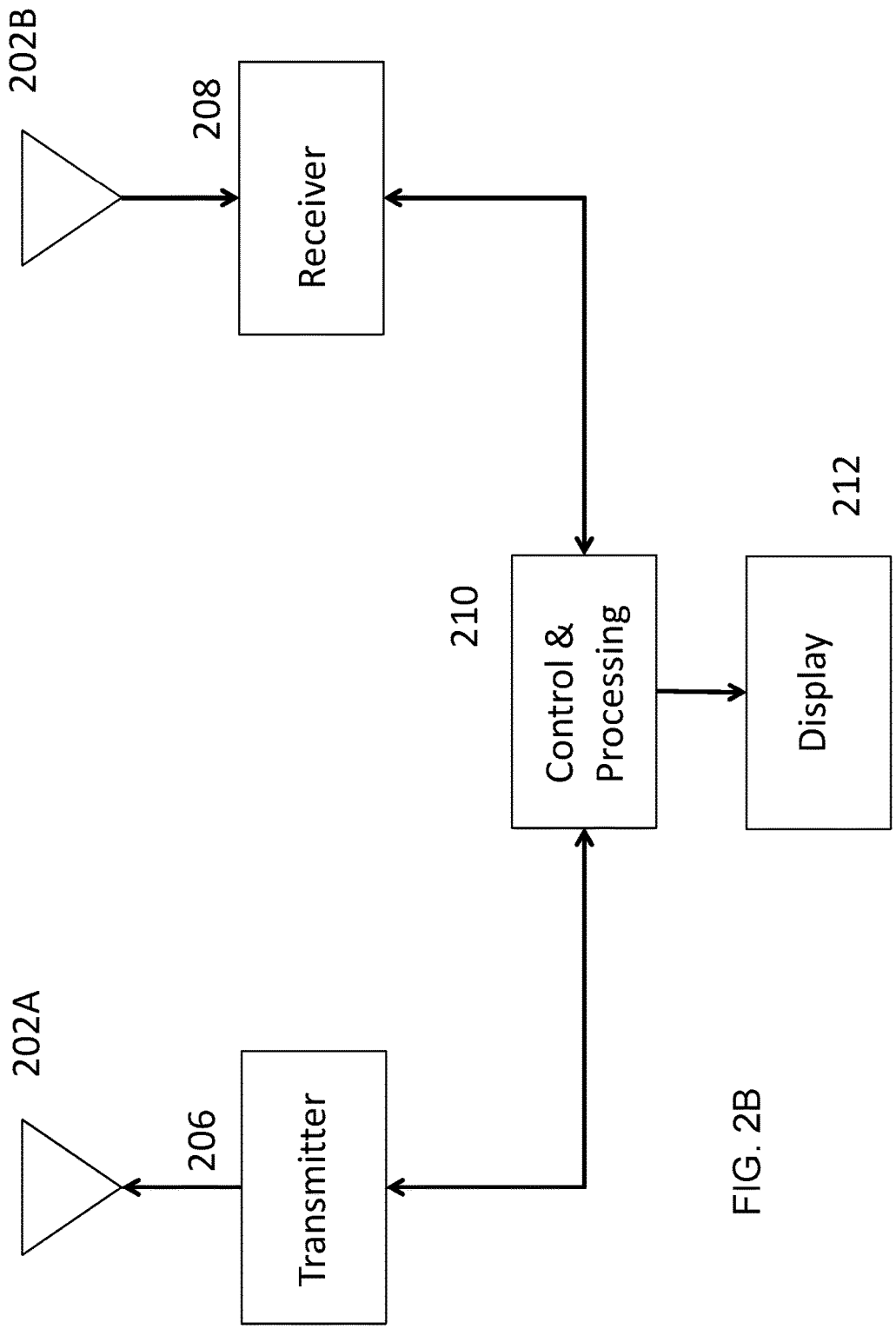

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. As discussed herein, the control and processing module 210 is also operable to produce a radar data output that is provided to other control units. The control and processing module 210 is also operable to control the transmitter 206. FIG. 2B illustrates an alternative exemplary radar system 250 with a pair of antennas 202a, 202b, a separate antenna 202a for the transmitter 206 and another antenna 202b for the receiver 208.

Radars with a single transmitter/antenna and a single receiver/antenna can determine distance to a target/object but cannot determine a direction or an angle of an object from the radar sensor or system (unless the transmit antenna or receive antenna is mechanically scanned). To achieve angular information, either multiple transmitters/antennas or multiple receivers/antennas or both are needed. The larger the number of transmitters and receivers (with corresponding antennas), the better the resolution possible. A system with multiple transmitters and multiple receivers is also called a multiple input, multiple output or MIMO system. As discussed herein, a quantity of virtual receivers/antennas (a quantity of physical transmitters times a quantity of physical receivers equals a quantity of virtual receivers/antennas).

Figure 3:
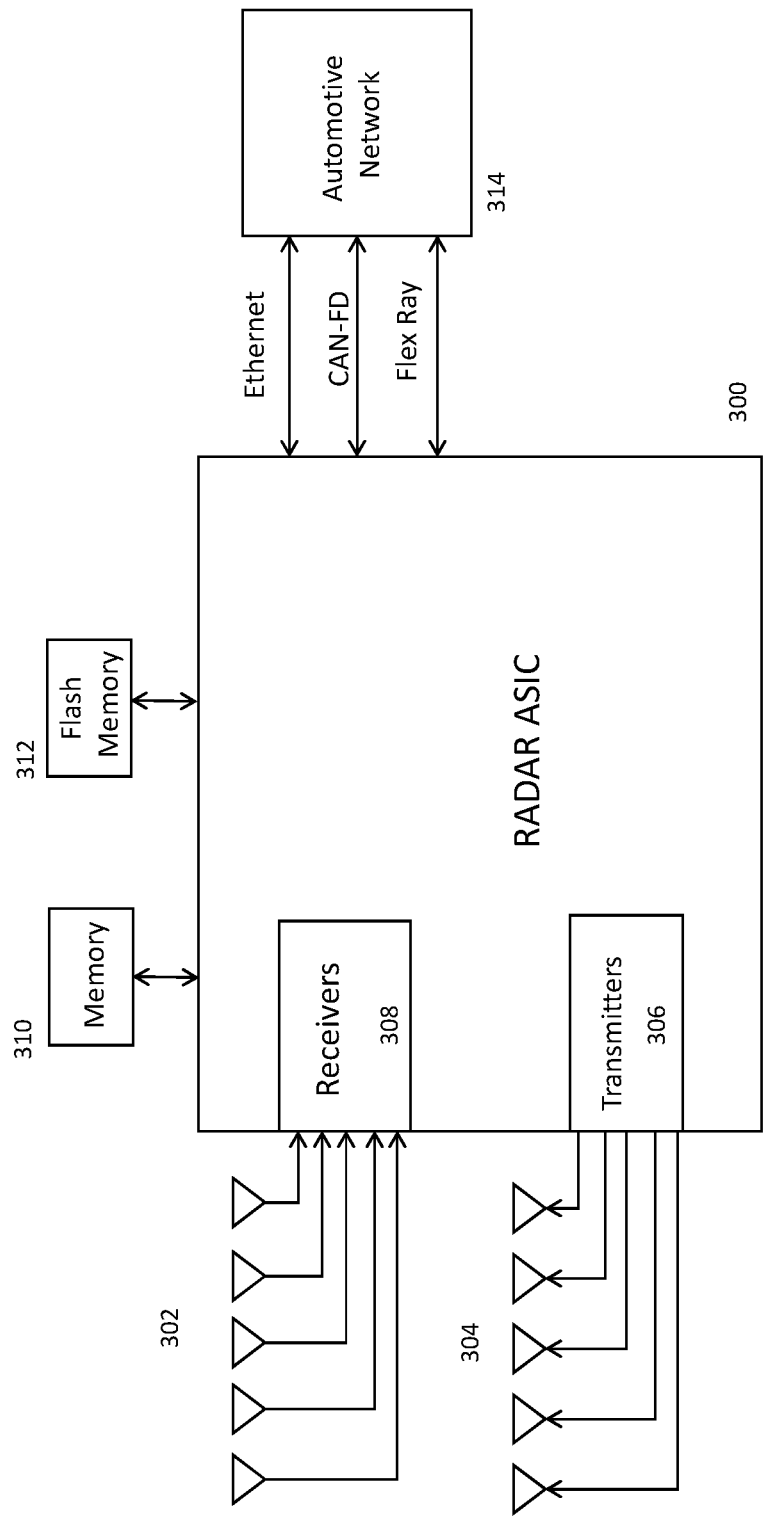
FIG. 3 is a block diagram illustrating a radar system with a plurality of transmitters and transmit antennas and a plurality of receivers and receive antennas in accordance with the present invention.

An exemplary MIMO radar system is illustrated in FIG. 3 with multiple transmitters 306 connected to multiple transmit antennas 304 and multiple receivers 308 connected to multiple receive antennas 302. Using multiple antennas allows a radar system 300 to determine the angle of objects/ targets in the environment. Depending on the geometry of the antenna system 300, different angles (e.g., with respect to the horizontal or vertical) can be determined. The radar system 300 may be connected to a network via an Ethernet connection or other types of network connections 314. The radar system 300 includes memory 310, 312 to store software used for processing the received radio signals to determine range, velocity, and location of objects/targets in the environment. Memory may also be used to store information about objects/targets in the environment.

The radar sensing system of the present invention may utilize aspects of the radar systems described in U.S. Pat. Nos. 9,753,121; 9,599,702; 9,575,160 and 9,689,967, and U.S. patent application Ser. No. 15/416,219, filed Jan. 26, 2017, Ser. No. 15/492,159, filed Apr. 20, 2017, Ser. No. 15/491,193, filed Apr. 19, 2017, Ser. No. 15/492,160, filed Apr. 20, 2017, Ser. No. 15/496,038, filed Apr. 25, 2017, Ser. No. 15/496,313, filed Apr. 25, 2017, Ser. No. 15/496,314, filed Apr. 25, 2017, Ser. No. 15/496,039, filed Apr. 25, 2017, Ser. No. 15/598,664, filed May 18, 2017, and Ser. No. 15/689,273, filed Aug. 29, 2017, and U.S. provisional application Ser. No. 62/528,789, filed Jul. 5, 2017, which are all hereby incorporated by reference herein in their entireties.

With MIMO radar systems, each transmitter signal is rendered distinguishable from every other transmitter by using appropriate differences in the modulation, for example, different digital code sequences. Each receiver correlates with each transmitter signal, producing a number of correlated outputs equal to the product of the number of receivers with the number of transmitters. The outputs are deemed to have been produced by a number of virtual receivers, which can exceed the number of physical receivers. In general, if there are N transmitters (T×N) and M receivers (R×M), there will be N×M virtual receivers, one for each transmitter-receiver pair.

Figure 4:
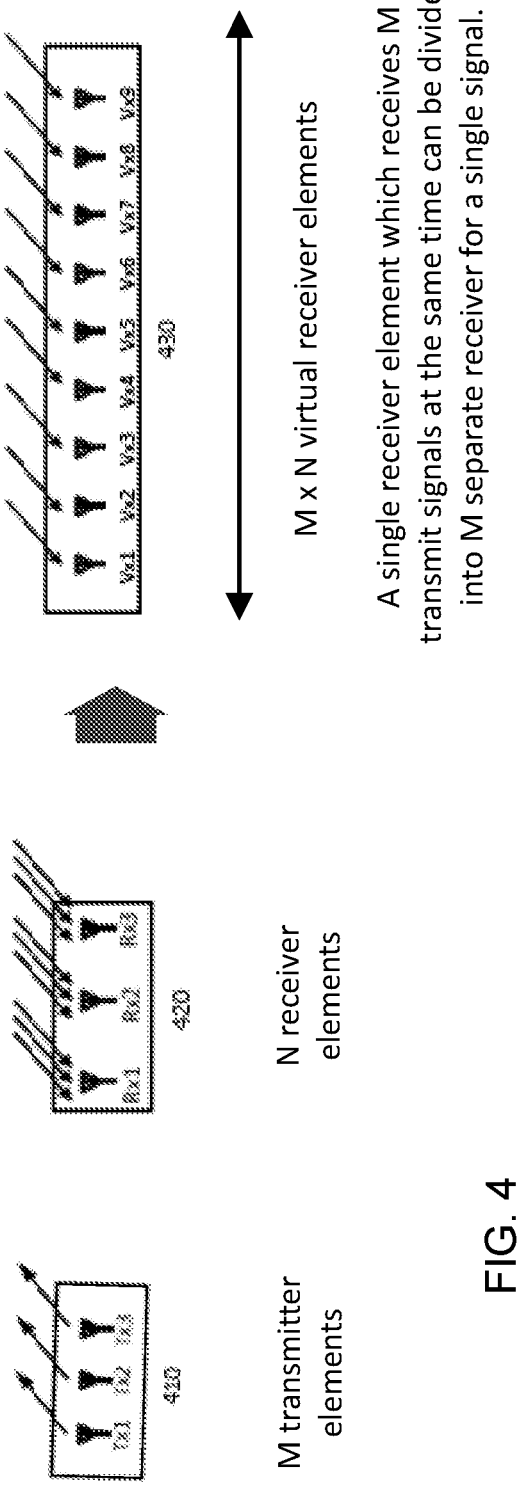
FIG. 4 illustrates capabilities of a radar system with multiple transmitters and transmit antennas and multiple receivers and receive antennas.

FIG. 4 illustrates a MIMO antenna configuration with three transmitters/antennas: Tx1, Tx2, and Tx3 (410) and three receivers/antennas: Rx1, Rx2, Rx3 (420). Each of the three receivers/antennas receives and processes the signals from each of the three transmitters/antennas resulting in nine virtual receivers/antennas: Vrx1, Vrx2, Vrx3, Vrx4, Vrx5, Vrx6, Vrx7, and Vrx9 (430). The spatial distribution of the virtual receive antennas is given by the spatial convolution of the positions of the transmit and receive antennas.

In a preferred radar system of the present invention, there are 1-8 transmitters and 4-8 receivers, or more preferably 4-8 transmitters and 8-16 receivers, and most preferably 16 or more transmitters and 16-64 or more receivers.

Figure 5A:
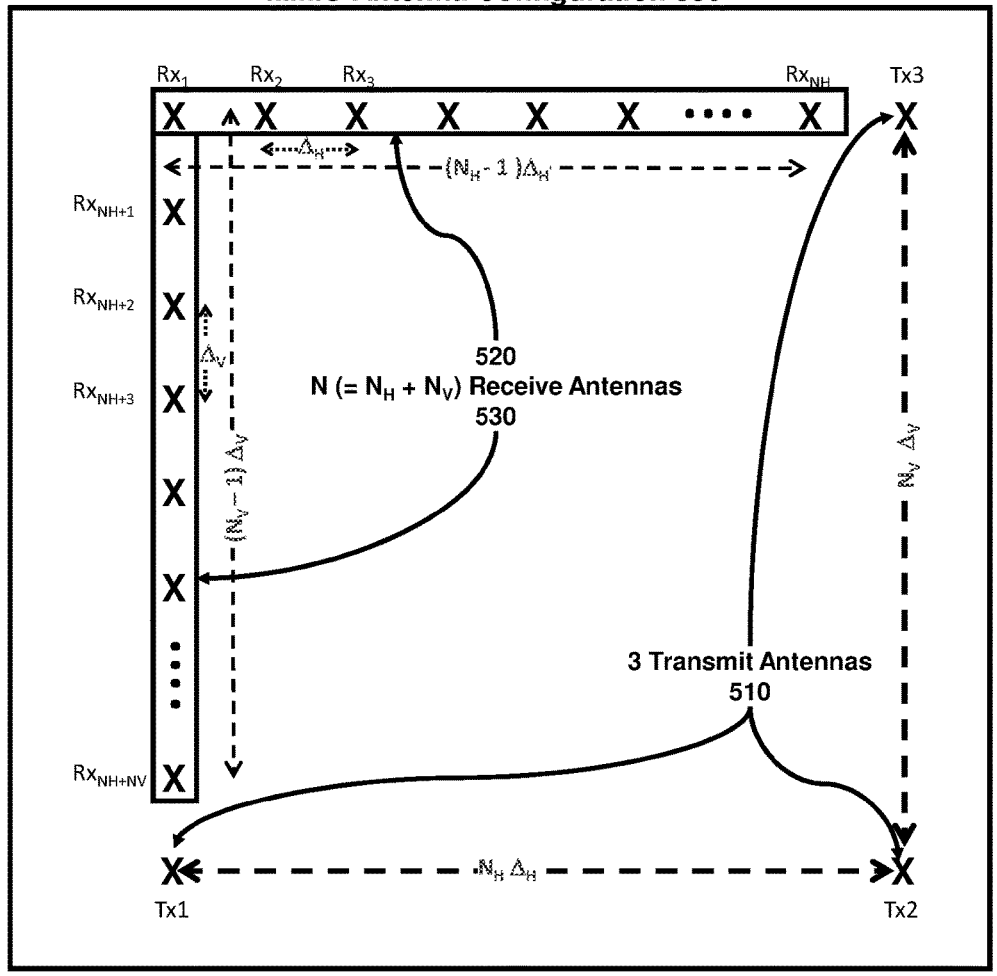
FIG. 5A is a diagram illustrating a two dimensional (2D) MIMO configuration in accordance with an aspect of the present invention.

Two-Dimensional Arrays for Desired Virtual Radar Configurations:

In an aspect of the present invention, FIG. 5A illustrates an exemplary MIMO antenna configuration 500 that is most efficient in terms of a number of antennas and an antenna board size for a given level of 2D angle capability. The multiple-input, multiple-output (MIMO) configuration illustrated in FIG. 5A incorporates 3 transmit antenna elements 510 and N receive antenna elements 520, 530. The antenna elements 510, 520, 530 are placed in a manner that minimizes the physical size of an antenna board needed to synthesize virtual uniform linear receive arrays in both the horizontal and vertical dimensions, with a length equal to twice a physical length of the corresponding receive arrays. The key design features include two uniform linear arrays of receive antennas, one being composed of $N_H$ antennas disposed horizontally (520) with spacing $\Delta_H$ and the other being composed of $N_V$ antennas disposed vertically (530) with spacing $\Delta_V$, (the total number of receive antennas $N=N_H+N_V$) and with corresponding transmit antennas separated by a distance equal to $N_X \Delta_X$ where $N_X$ equals the number receive antennas and $\Delta_X$ equals the spacing between the receive antennas in the corresponding uniform linear receive array. As illustrated in FIG. 5A, an exemplary horizontal linear array 520 of receive antenna elements is arranged along one edge of an antenna board, while an exemplary vertical linear array 530 of receive antenna elements is arranged along an adjacent edge of the antenna board.

Figure 5B:
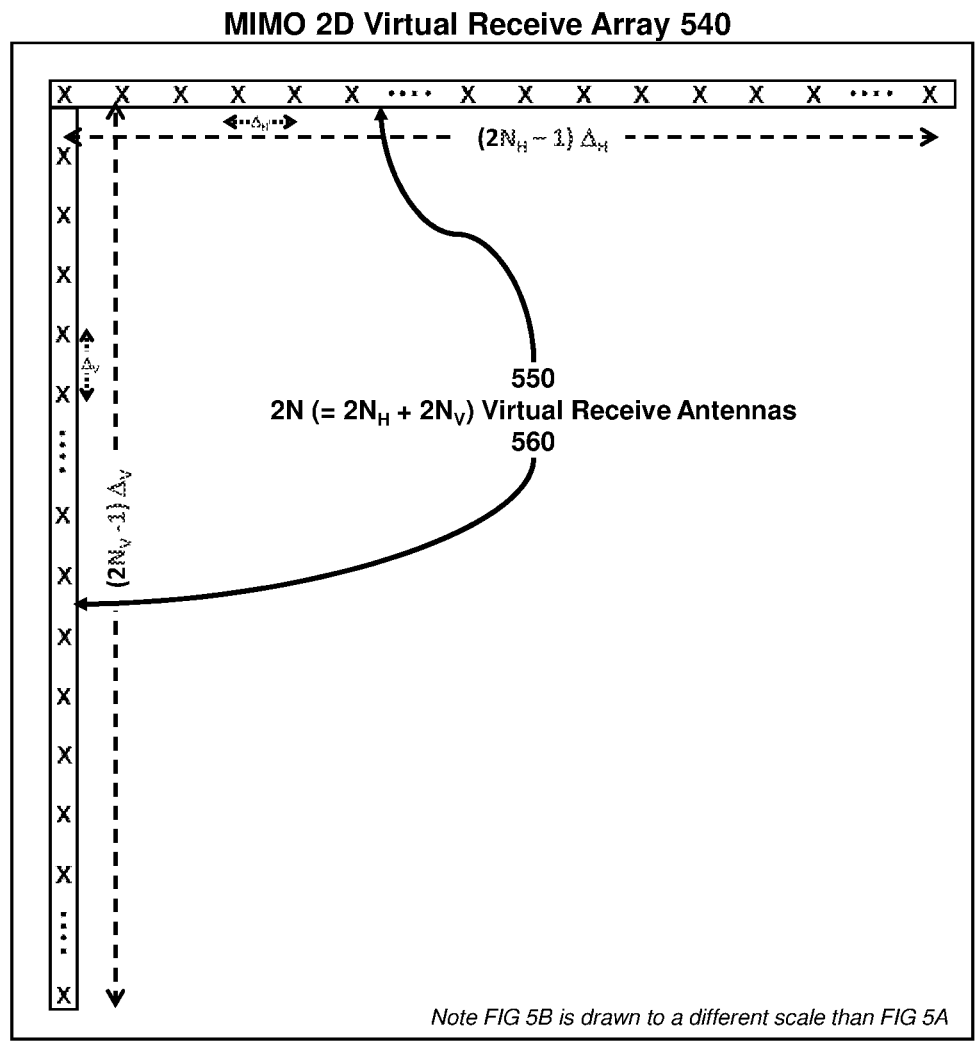
FIG. 5B is a diagram illustrating a 2D virtual receive array synthesized by the MIMO configuration of FIG. 5A.

The MIMO virtual array 540 formed by the antenna configuration of FIG. 5A is illustrated in FIG. 5B. Two uniform virtual linear receive arrays 550, 560 are synthesized, one disposed horizontally (550) with $2N_H$ virtual antennas spaced by $\Delta_H$ and one disposed vertically (560) with $2N_V$ virtual antennas spaced by $\Delta_V$, the number of virtual receive antennas being twice the number of antennas in the corresponding real receive array of FIG. 5A.

As described above, MIMO configurations in accordance with the present invention may be arranged that provide 2D angle capability with aperture doubling in both the horizontal and vertical dimensions with only 3 transmit antennas and with placement of the transmit and receive antennas in a manner that minimizes the physical size of the antenna board for the given level of 2D angle capability. The given level of 2D angle capability (and antenna board size) scales by the number of receive antennas incorporated ($N_H+N_V=N$) and their spacing ($\Delta_H$ and $D_V$).

The MIMO configuration and virtual receiver arrays illustrated in FIGS. 5A and 5B, respectively, provide 2D angle capability via two uniform linear arrays. For target detection and angle measurement, the two linear arrays can be processed independently or combined coherently to form a composite antenna response prior to detection and/or angle measurement. In either case, the virtual receiver array is rather sparse with inherent tradeoffs in 2D angle performance compared to a fully filled 2D array (e.g., with respect to detection of multiple objects at different azimuth or elevation angles or imaging of a single distributed object).

Figure 8:
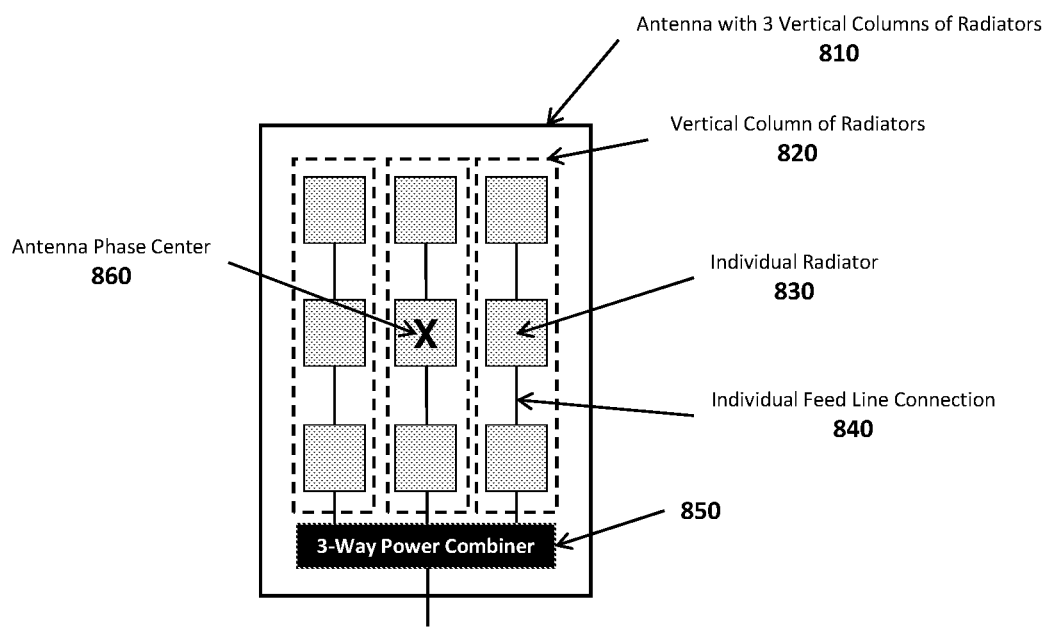
FIG. 8 is a diagram illustrating an example antenna comprised of multiple radiating elements in accordance with the present invention.
Figure 9A:
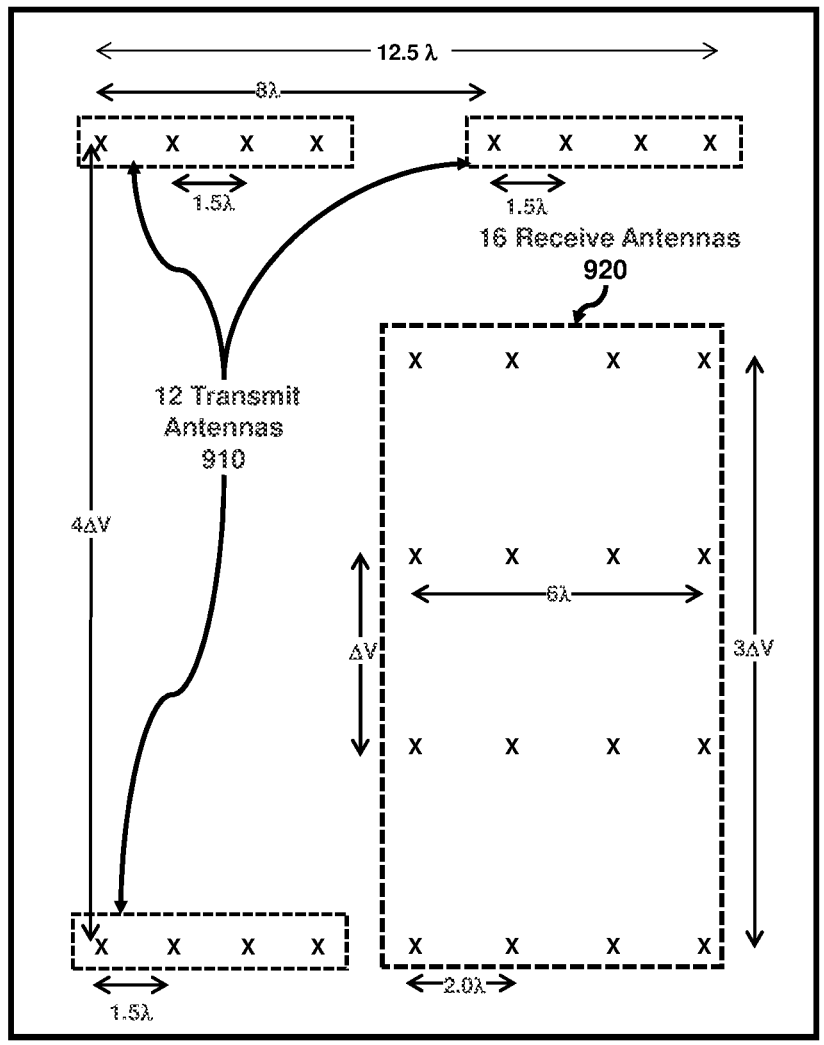
FIG. 9A is a diagram illustrating a 2D MIMO configuration in accordance with another aspect of the present invention.
Figure 9B:
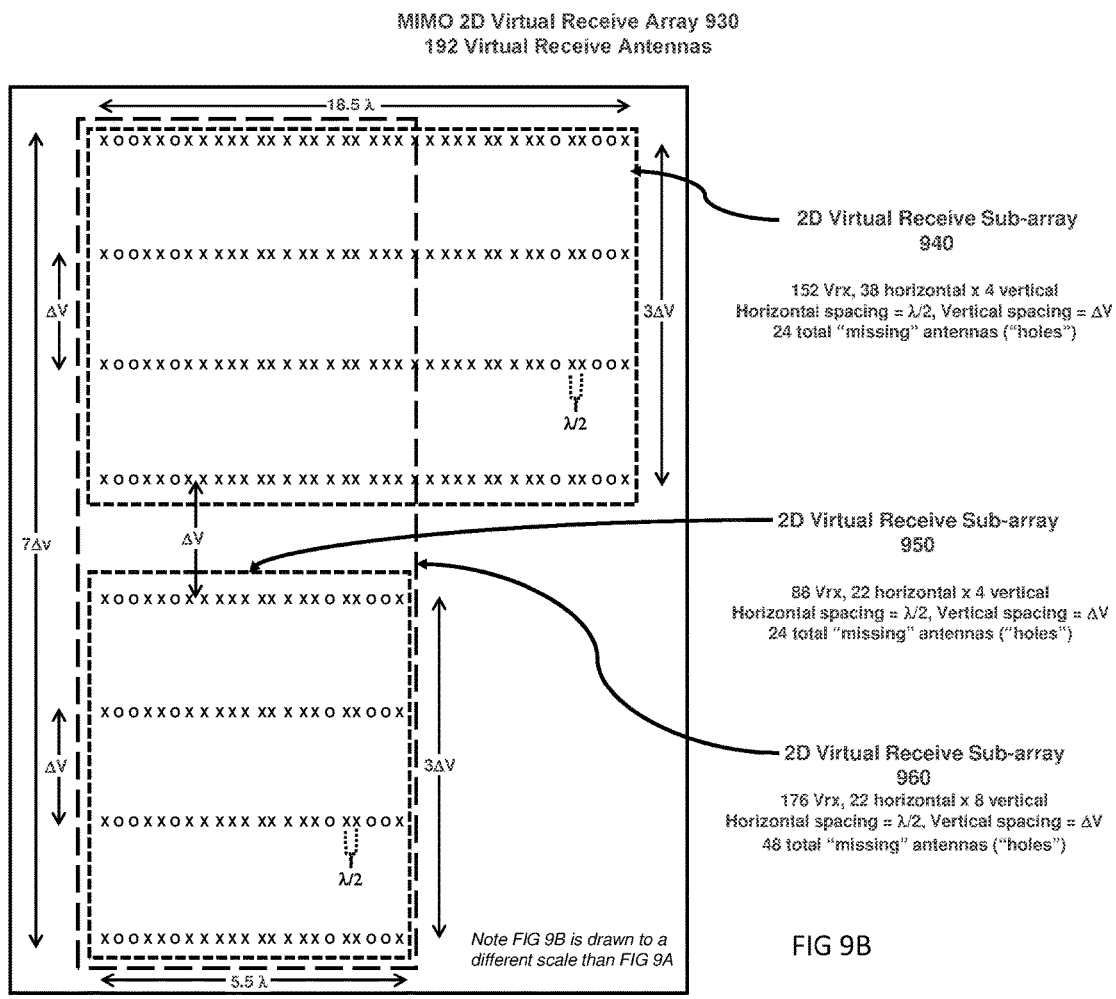
FIG. 9B is a diagram illustrating a 2D virtual receive array synthesized by the MIMO configuration of FIG. 9A in accordance with an aspect of the present invention.
Figure 10A:
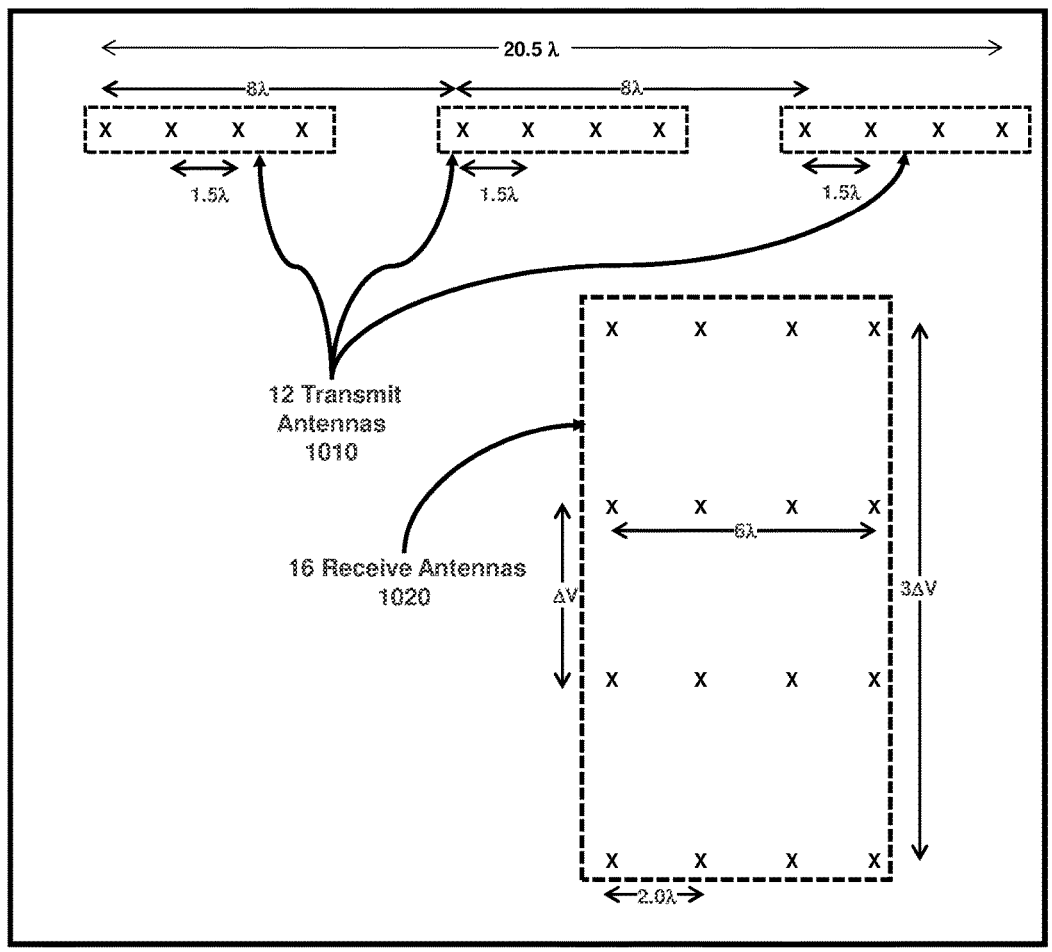
FIG. 10A is a diagram illustrating a 2D MIMO configuration in accordance with an aspect of the present invention.
Figure 10B:
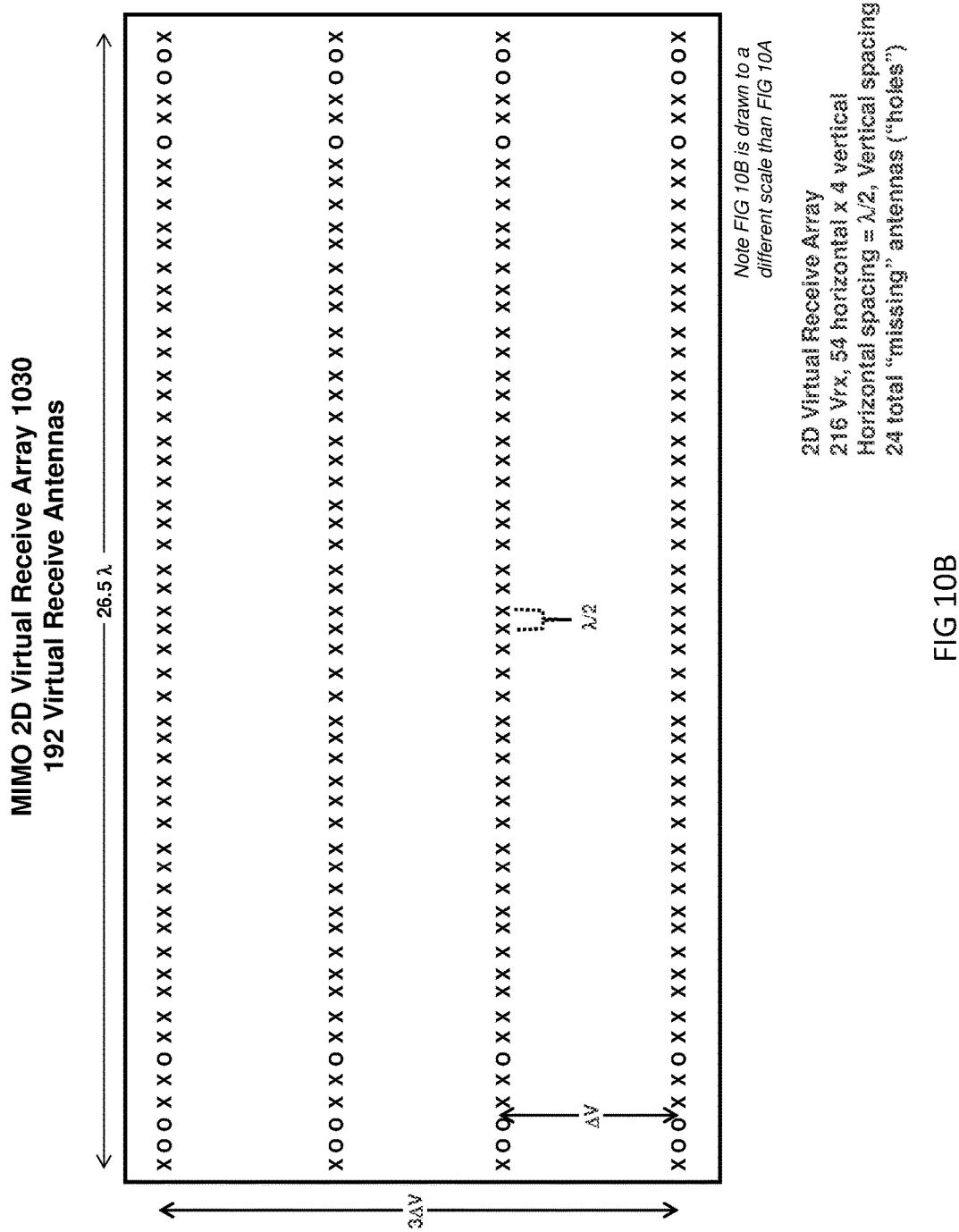
FIG. 10B is a diagram illustrating a 2D virtual receive array synthesized by the MIMO configuration of FIG. 10A in accordance with an aspect of the present invention.
Figure 11A:
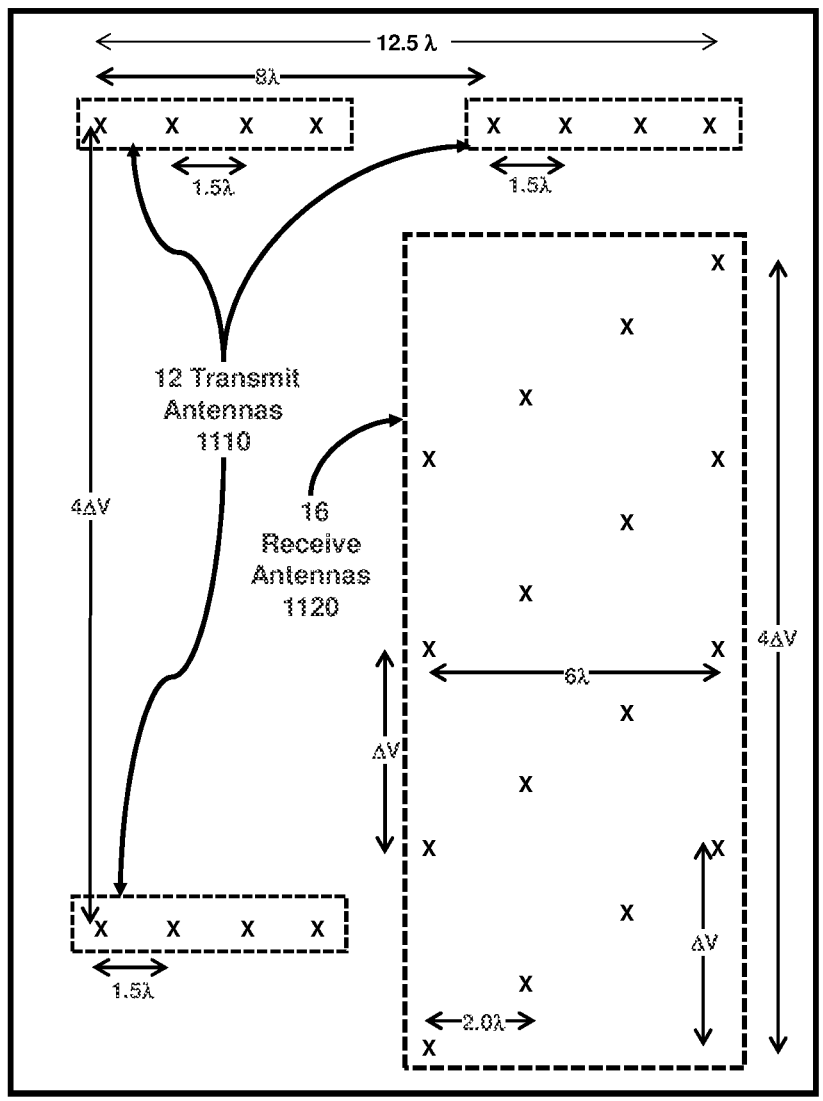
FIG. 11A is a diagram illustrating a 2D MIMO configuration in accordance with an aspect of the present invention.
Figure 11B:
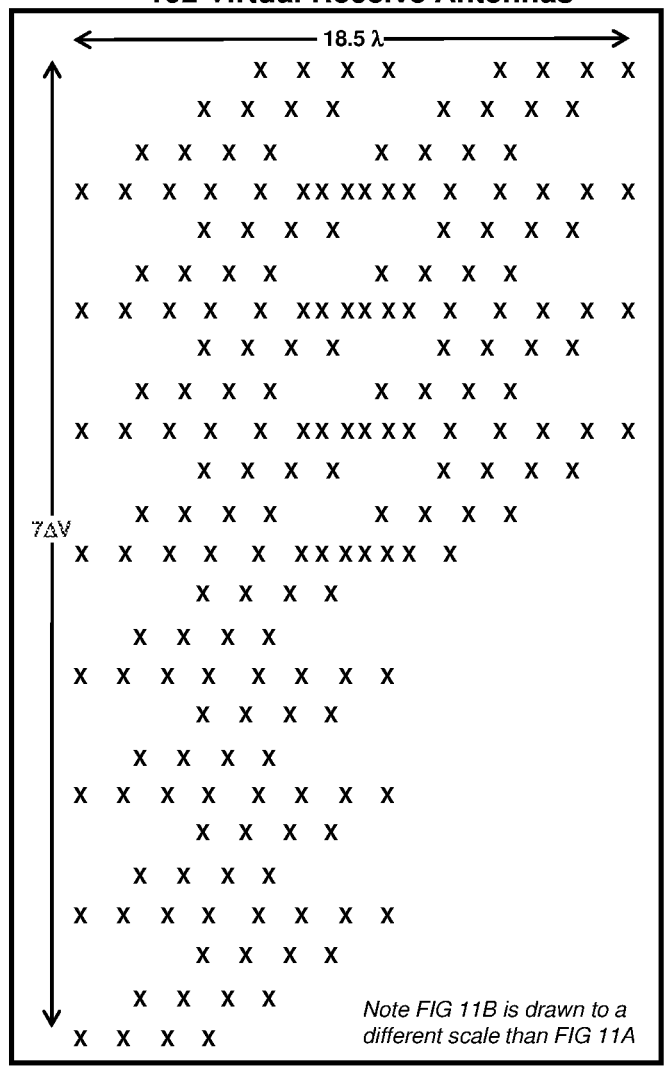
FIG. 11B is a diagram illustrating a 2D virtual receive array synthesized by the MIMO configuration of FIG. 11A in accordance with an aspect of the present invention.
Figure 12A:
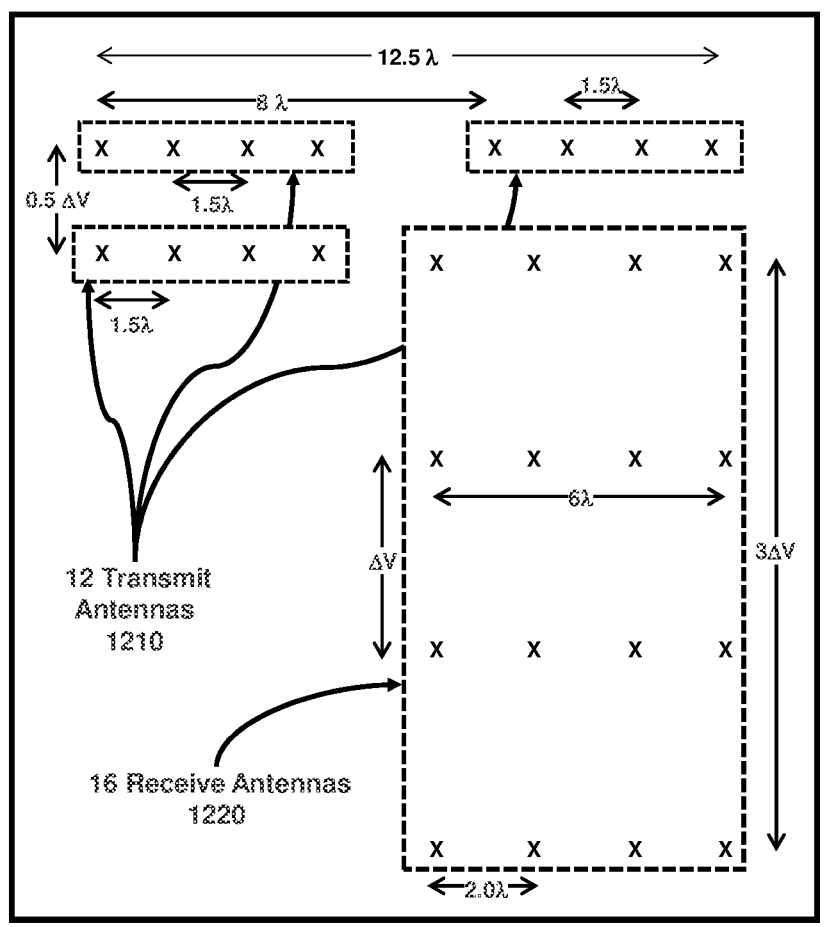
FIG. 12A is a diagram illustrating a 2D MIMO configuration in accordance with an aspect of the present invention.
Figure 12B:
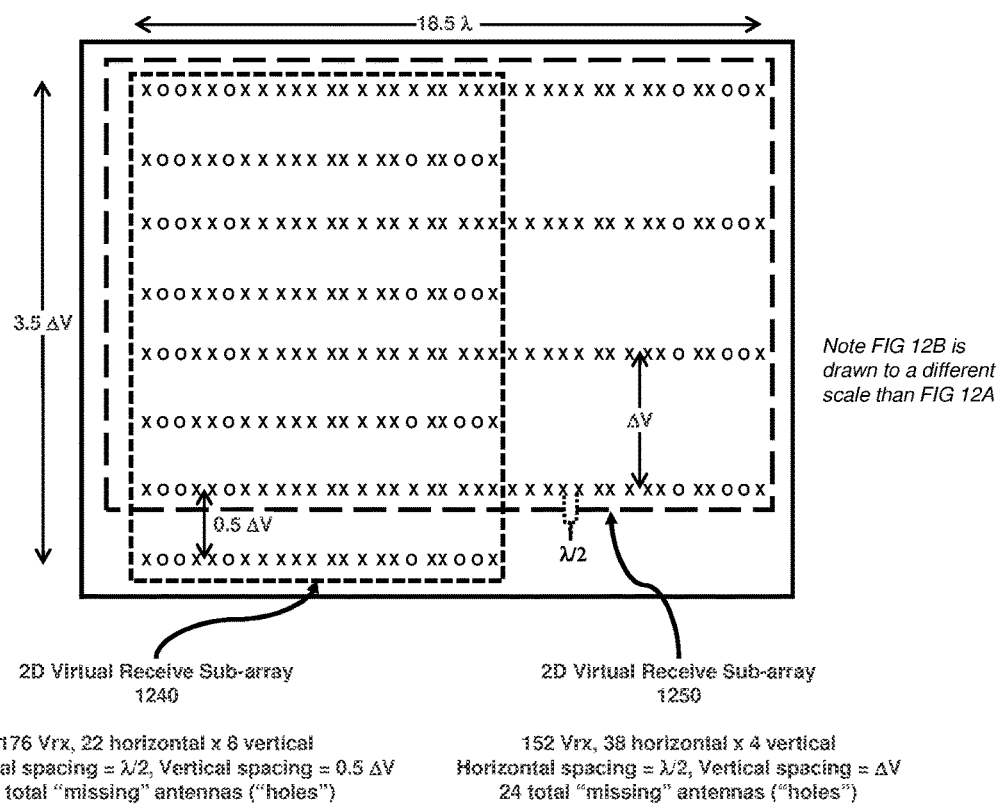
FIG. 12B is a diagram illustrating a 2D virtual receive array synthesized by the MIMO configuration of FIG. 12A in accordance with an aspect of the present invention.
Figure 13A:
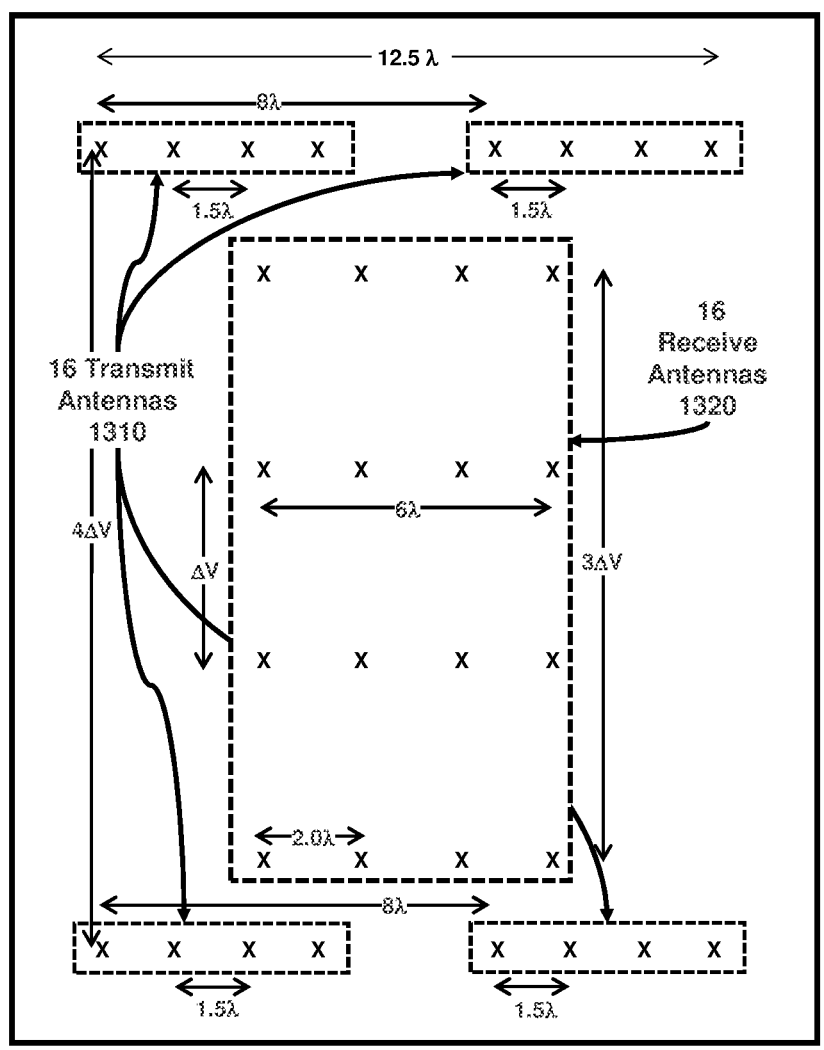
FIG. 13A is a diagram illustrating a 2D MIMO configuration in accordance with an aspect of the present invention.
Figure 13B:
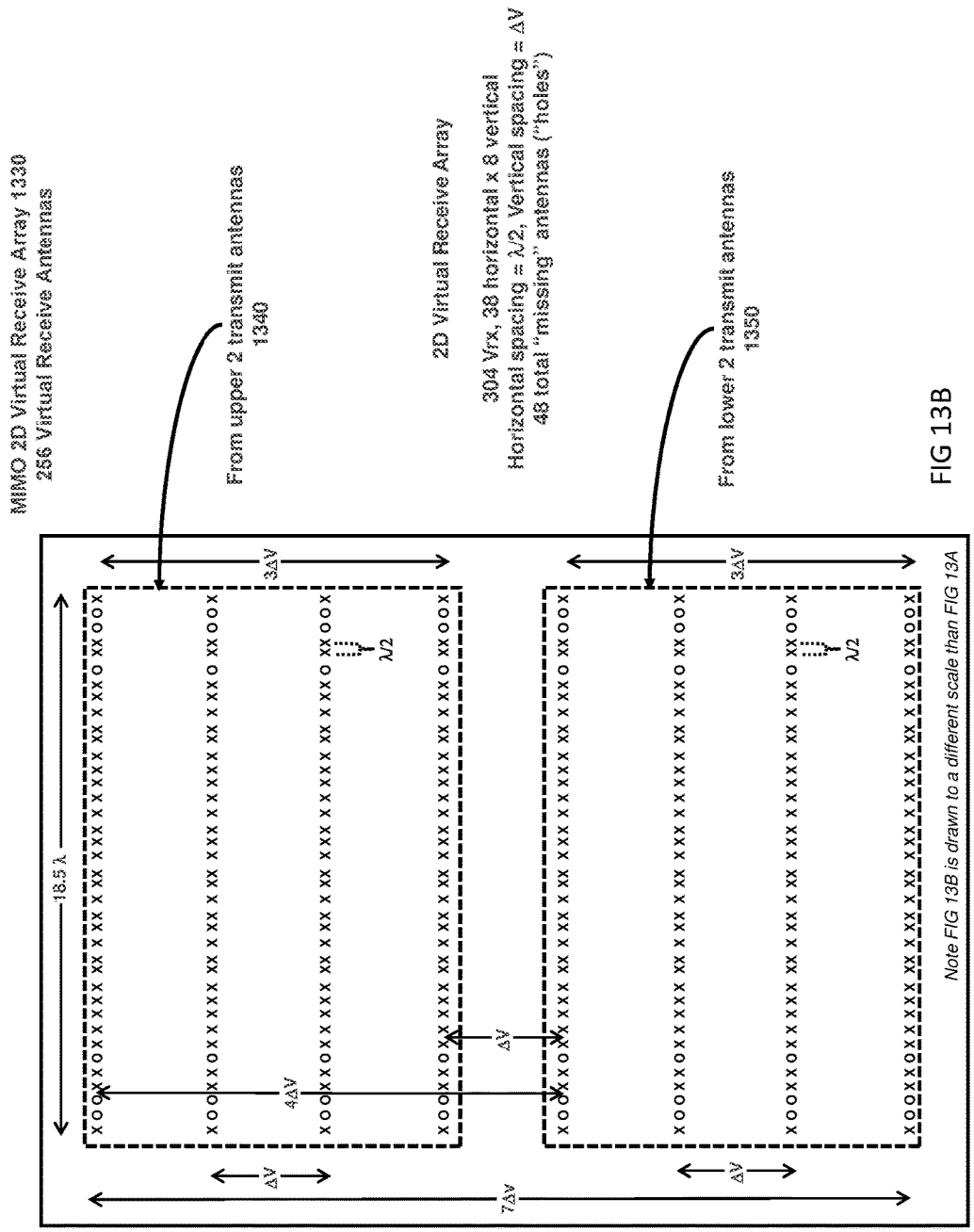
FIG. 13B is a diagram illustrating a 2D virtual receive array synthesized by the MIMO configuration of FIG. 13A in accordance with an aspect of the present invention.
Figure 14A:
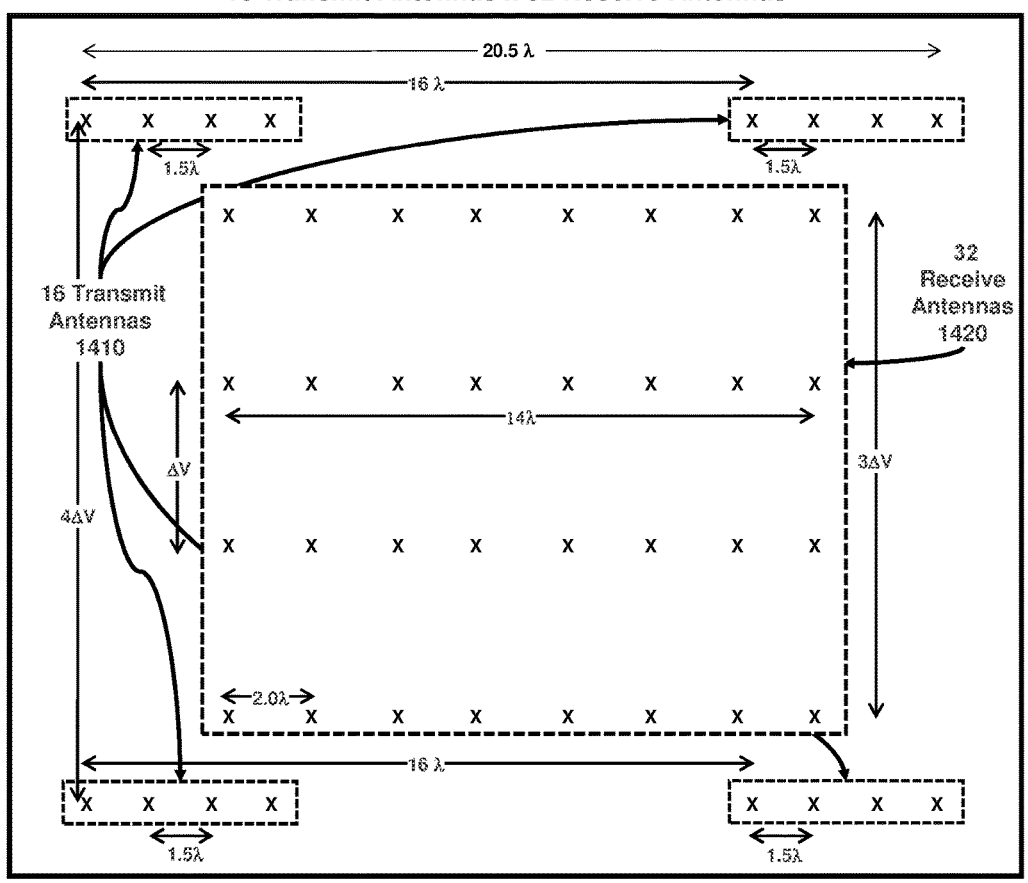
FIG. 14A is a diagram illustrating a 2D MIMO configuration in accordance with an aspect of the present invention.
Figure 15A:
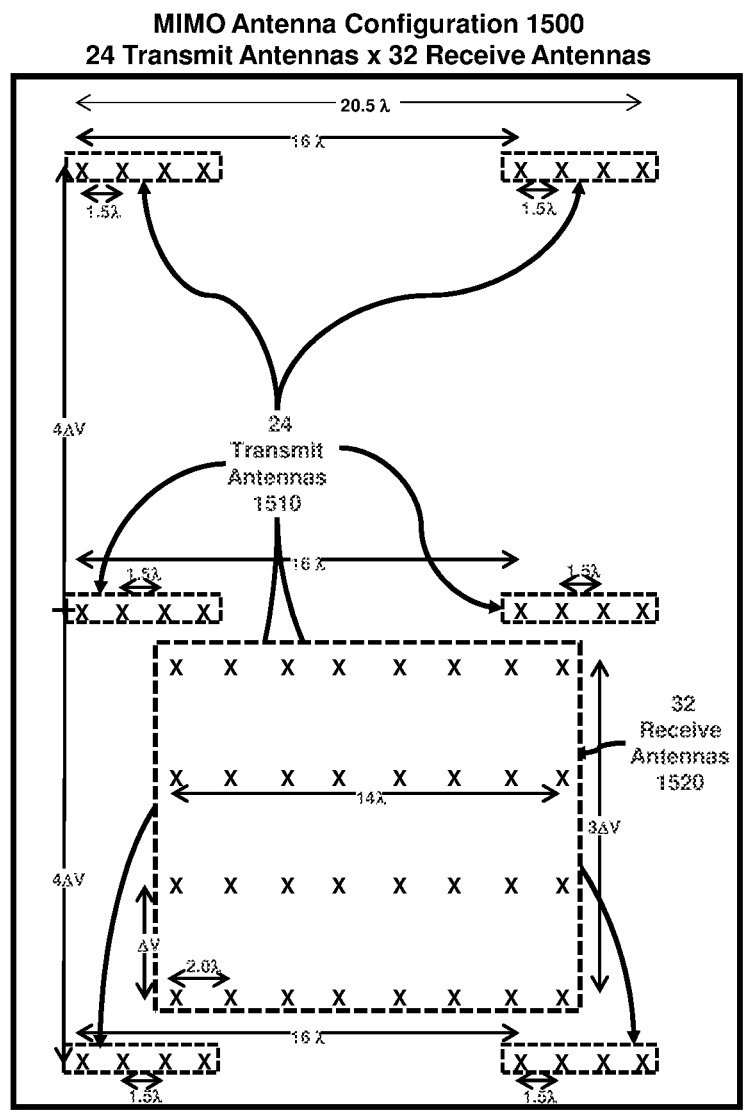
FIG. 15A is a diagram illustrating a 2D MIMO configuration in accordance with an aspect of the present invention.
Figure 15B:
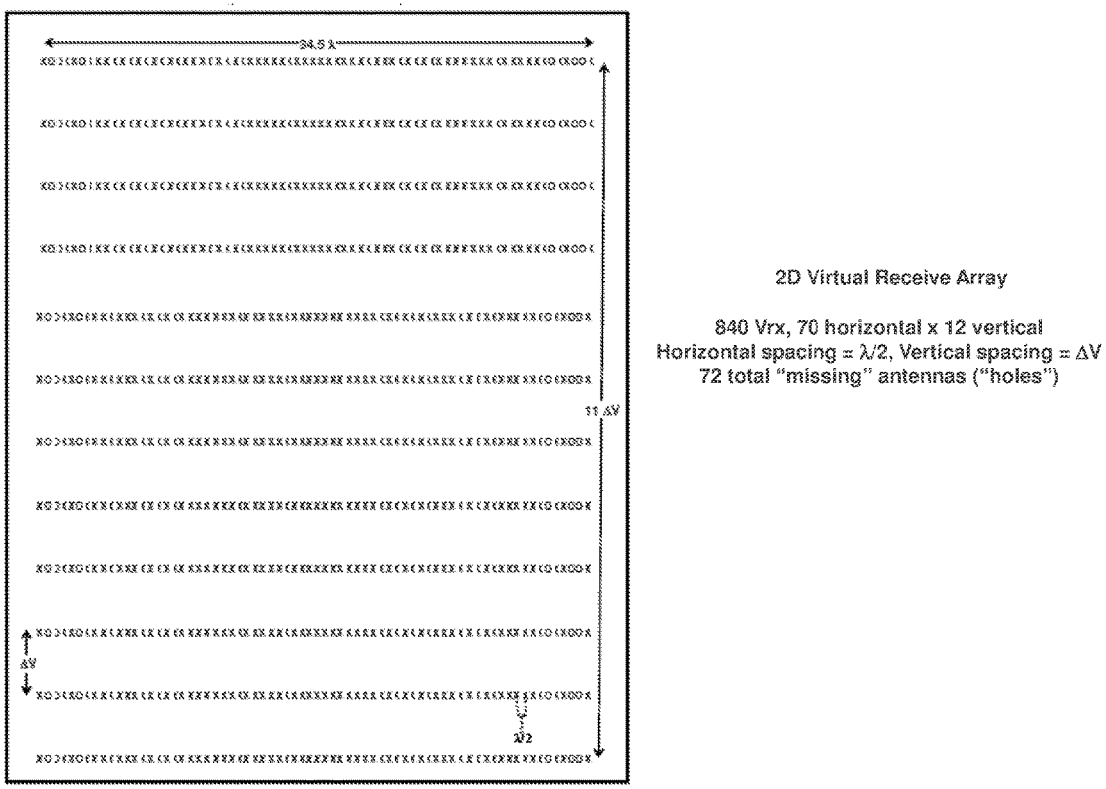
FIG. 15B is a diagram illustrating a 2D virtual receive array synthesized by the MIMO configuration of FIG. 15A in accordance with an aspect of the present invention.
Figure 16A:
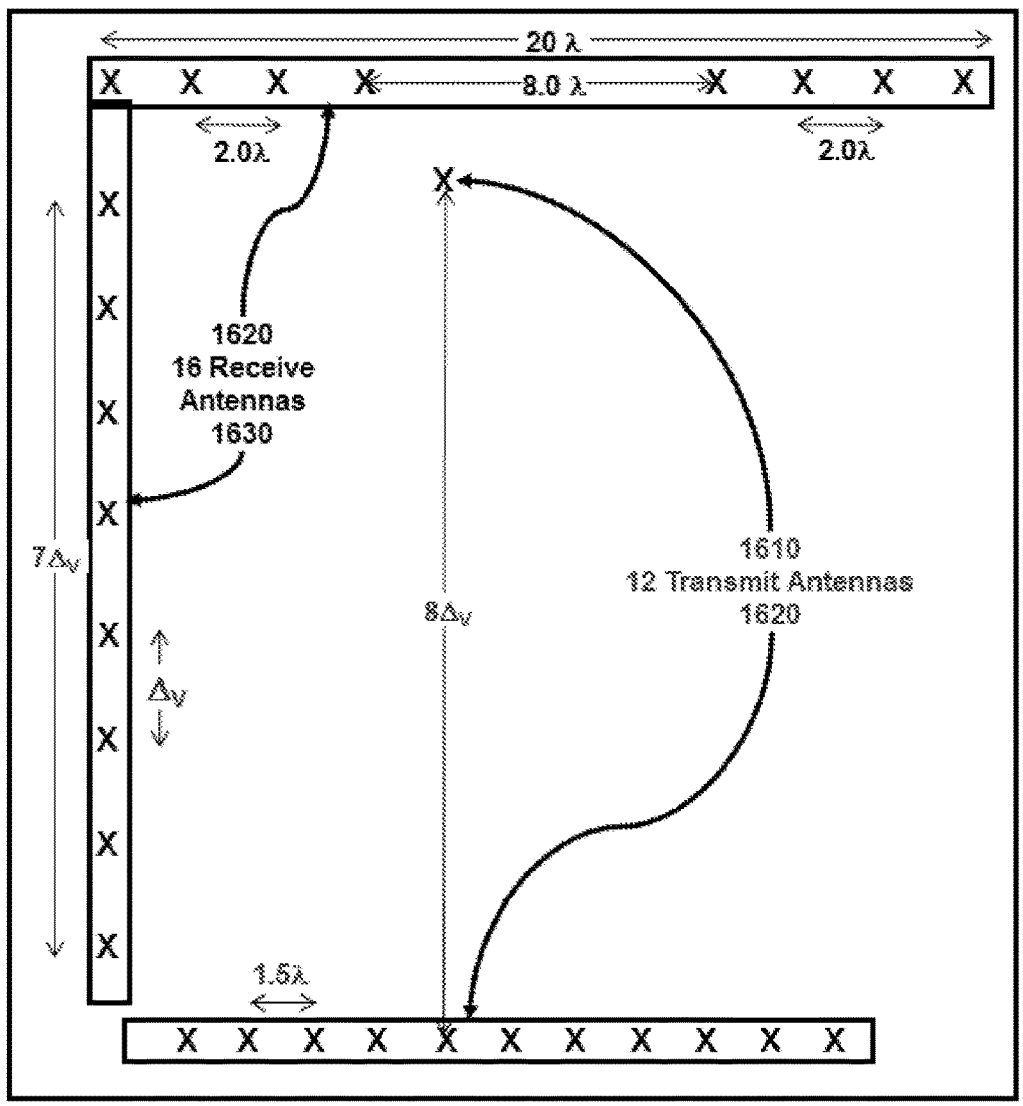
FIG. 16A is a diagram illustrating a 2D MIMO configuration in accordance with an aspect of the present invention.
Figure 16B:
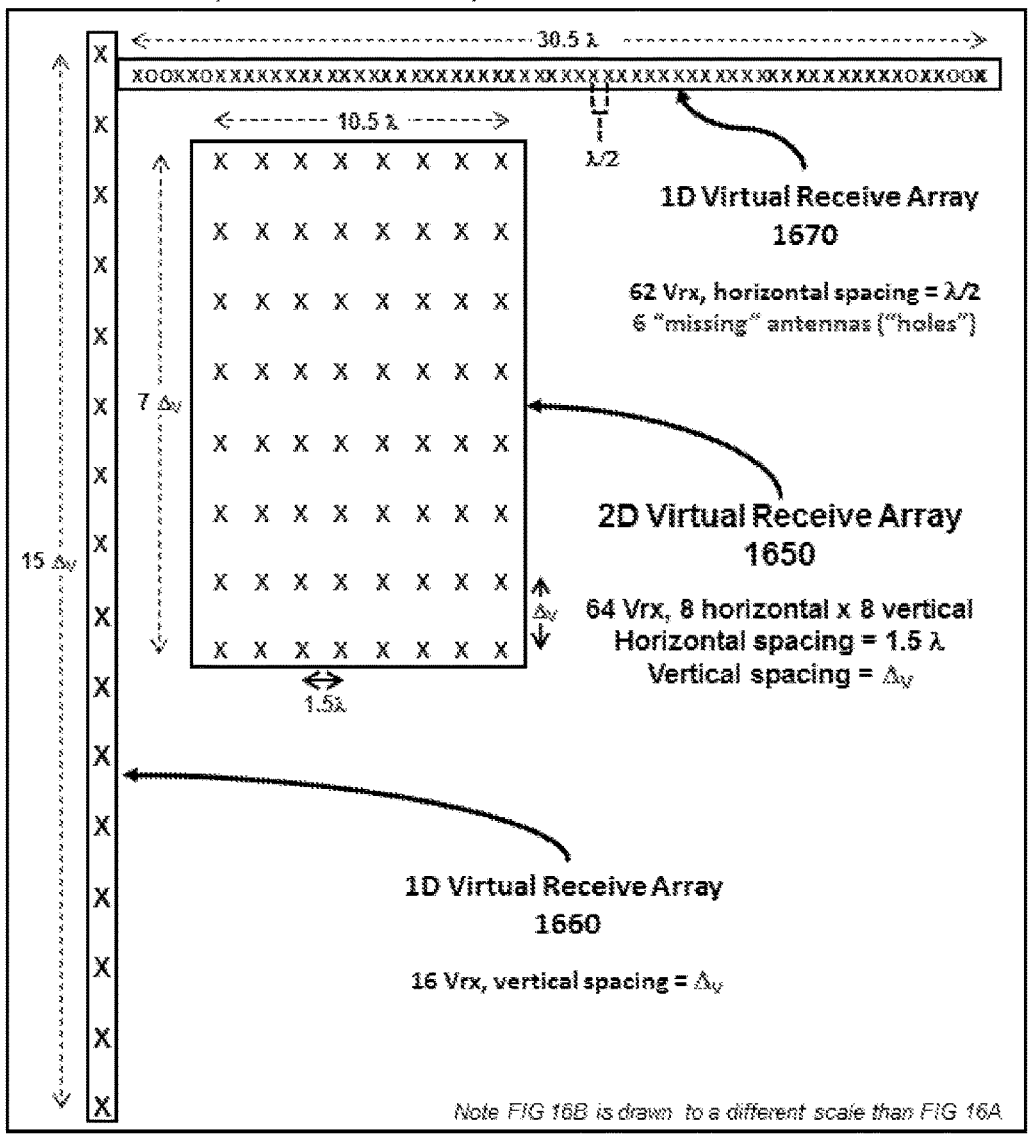
FIG. 16B is a diagram illustrating a 2D virtual receive array synthesized by the MIMO configuration of FIG. 16A in accordance with an aspect of the present invention.

The symbols "X" in FIG. 5A represent the positions of the phase centers of the respective transmit and receive antennas. The antennas themselves may consist of single or multiple radiators depending on the required gain and beamwidth of the particular MIMO antennas. FIG. 8 illustrates an exemplary antenna 810 consisting of three linear arrays of radiators that are arranged as vertical columns of radiators 820. Each of the three vertical columns of radiators consist of three individual radiators 830 connected by feed lines 840. The three vertical columns of radiators are combined into a single antenna port using a three-way power combiner 850. The phase center 860 of the example antenna is indicated by the symbol "X".

In general, each of the various transmit and receive antennas can be of different size and incorporate a different number and/or configuration of radiators. The size of the individual transmit and receive antennas will constrain the minimum spacing between their phase centers (for example, $\Delta_H$ and $\Delta_V$ in FIG. 5) to be used in the MIMO configuration.

The MIMO antennas can be implemented using well known antenna structures and fabrication techniques, including multi-layer printed circuit board antennas with, for example, microstrip feed lines and patch radiators, substrate integrated waveguide (SIW) feed lines and SIW slotted radiators, coplanar waveguide feed lines with SIW slotted radiators, or suitable combinations thereof. Other common types of feed and radiator structures can be used as well. The antenna illustrated in FIG. 8 would typically be recognized to represent patch radiators 830 connected by microstrip feed lines 840.

In general, to improve radar detection range and/or angle capability, large arrays of antennas are needed leading to increased size and/or cost. The number of antennas in the array can be reduced by spacing the individual antennas by a distance greater than $\lambda/2$ (where $\lambda$ is wavelength of the transmitted radio signal) with the inherent penalty of grating lobes (multiple ambiguous replicas of the mainlobe and/or large radiation side lobes produced by antenna arrays when element spacing is too large).

Figure 6A:
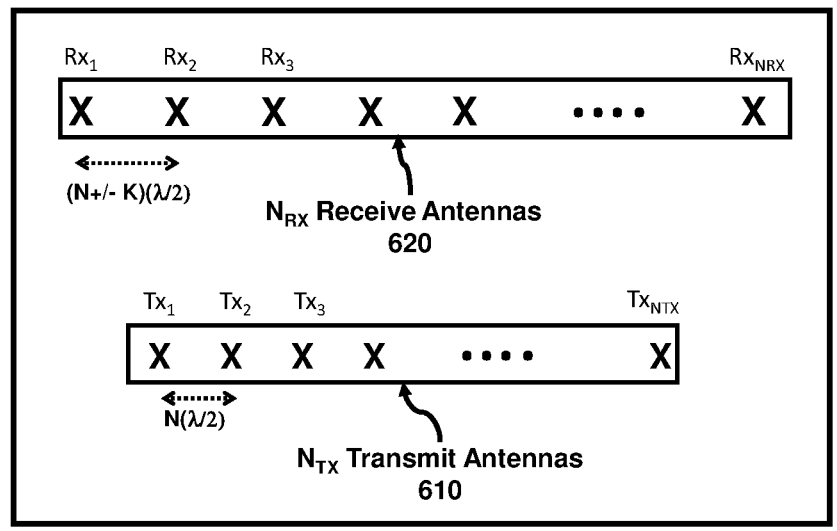
FIG. 6A is a diagram illustrating 2D MIMO configuration in accordance with another aspect of the present invention.

In another aspect of the present invention, FIG. 6A illustrates an exemplary MIMO antenna configuration 600 using a linear array of transmit antennas 610 and a linear array of receive antennas 620 with uniform spacing substantially greater than $\lambda/2$, yet producing a virtual receive sub-array 630 (illustrated in FIG. 6B) with antennas spaced $\lambda/2$ apart. For a given number of antennas, this style of MIMO antenna configuration synthesizes a longer virtual receiver array compared to MIMO configurations with transmit and/or receive antennas spaced by $\lambda/2$.

Furthermore, larger higher-gain antennas can be incorporated compared to MIMO configurations with antennas spaced by $\lambda/2$. Benefits of this exemplary style of MIMO configuration that incorporates larger higher-gain antennas in a manner that produces a longer virtual receive array with $\lambda/2$ spacing can include enhanced detection range and improved angle capability without introducing grating lobes.

The enabling innovation that synthesizes a MIMO virtual receive sub-array with antennas spaced $\lambda/2$ while using transmit and receive antennas spaced by greater than $\lambda/2$ is uniform spacing of the transmit antennas by an integer multiple of $\lambda/2$ and uniform spacing of the receive antennas by a different integer multiple of $\lambda/2$. The resulting MIMO virtual receive array may produce a few antennas at either end with a non-uniform spacing greater than $\lambda/2$. These antennas with non-uniform spacing can either be discarded or the "holes" (640) in the virtual array can be filled to further extend the length of the uniform virtual linear array 630. A number of different known techniques can be used to fill the holes. These techniques, which include linear prediction methods, fill the resulting holes produced through the non-uniform spacings and extend the length of the portion of the virtual receive sub-array with uniform spacing of virtual antennas via array interpolation techniques.

Figure 6B:
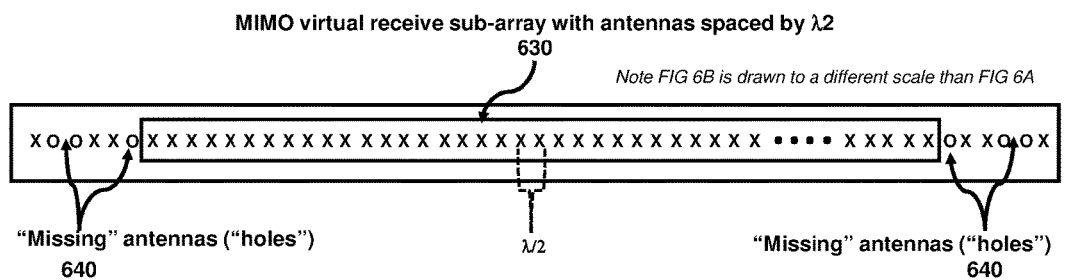
FIG. 6B is a diagram illustrating a 2D virtual receive array synthesized by the MIMO configuration of FIG. 6A in accordance with an aspect of the present invention.

For the MIMO antenna configuration of FIGS. 6A and 6B, the length of the resulting virtual receive array 630, and the associated angle capability, scales with the number of transmit and receive antennas incorporated, $N_{TX}$ and $N_{RX}$ respectively, and their respective spacings, $(N\lambda/2)$ and $(N+/-K)$ $\lambda/2$, respectively. The antennas can be oriented for a desired direction of 1D angle capability (e.g., either horizontally or vertically) or two sets of transmit and receive antennas can be used for 2D angle capability (e.g., one set with horizontal orientation and another set with vertical orientation).

Figure 7A:
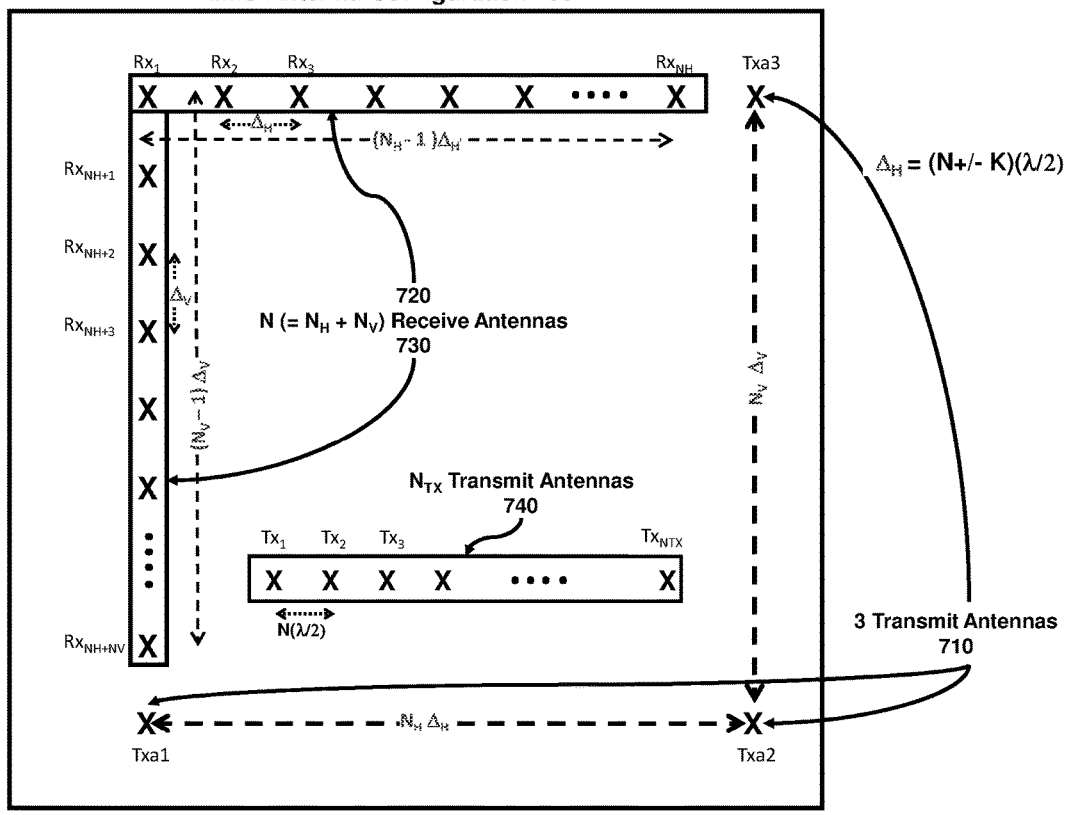
FIG. 7A is a diagram illustrating a 2D MIMO configuration in accordance with another aspect of the present invention.
Figure 7B:
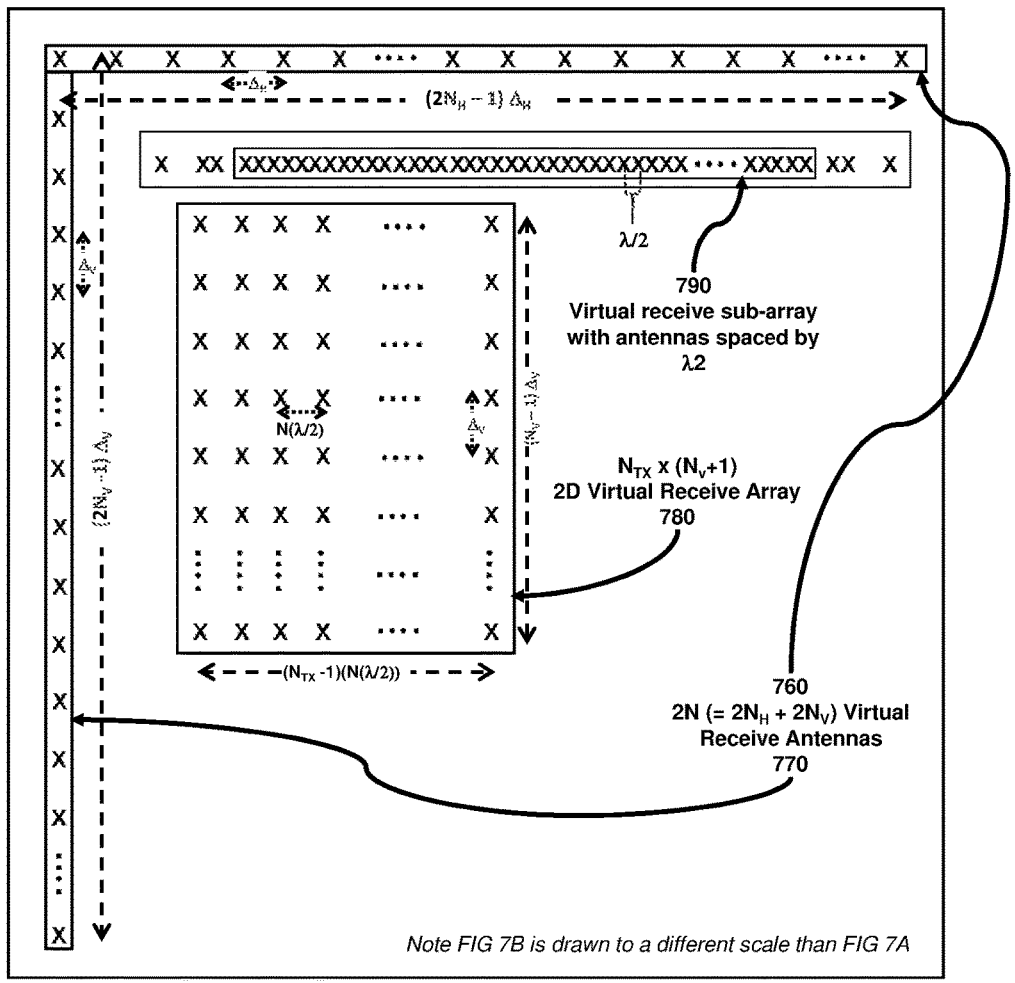
FIG. 7B is a diagram illustrating a 2D virtual receive array synthesized by the MIMO configuration of FIG. 7A in accordance with an aspect of the present invention.

In another aspect of the present invention, FIGS. 7A and 7B illustrate another MIMO configuration in accordance with the present invention. This particular MIMO configuration combines the MIMO configurations of FIGS. 5A and 5B and FIGS. 6A and 6B in a manner to further improve 2D angle capability. The exemplary MIMO configuration 700 of FIG. 7A is the MIMO configuration of FIG. 5A with the addition of the $N_{TX}$ transmit antennas of FIG. 6A (610 from FIG. 6A shown as 740 in FIG. 7A) with the additional constraint that $N_H$ horizontally disposed receive antennas are spaced by $\Delta_H=(N+/-K)(\lambda/2)$. This exemplary MIMO configuration synthesizes a MIMO virtual receive array 750 composed of several virtual sub-arrays, as illustrated in FIG. 7B. Attributes of this exemplary MIMO configuration include a more fully filled (less sparse) 2D virtual receive array (780) compared to the MIMO configuration of FIGS. 5A and 5B, aperture doubling in both the horizontal dimension and vertical dimension (virtual receive antennas 760 and 770, respectively) in a manner that minimizes the physical size of the antenna board for a given level of 2D angle capability and a virtual receive sub-array 790 with antennas spaced by $\lambda/2$ while using transmit and/or receive antennas spaced by greater than $\lambda/2$ (740 and 720, respectively).

The various sub-arrays illustrated in FIG. 7B can be processed independently for target detection and angle measurement, combined coherently to form a composite antenna response prior to detection and/or angle measurement, or various combinations of the sub-arrays can be processed independently or combined coherently. In any case, the diversity of virtual receive arrays illustrated in FIG. 7B improve 2D angle capability in a synergistic manner compared to the MIMO configurations illustrated in FIGS. 5A and 5B and FIGS. 6A and 6B.

For example, the benefit of the more fully filled (less sparse) 2D virtual receive array (780) shown in FIG. 7B compared to the 2D array of FIG. 5B (550+560) includes improved 2D angle resolution capability with respect to multi-target discrimination (detection of multiple objects at different azimuth or elevation angles) and also with respect to imaging a single distributed object. Further, if the spacings of the transmit antennas and/or receive antennas used to synthesize the 2D virtual receive array are greater than $\lambda/2$ (as may be desired to produce a narrow beam), the antennas in the 2D virtual array will likewise be spaced by greater than $\lambda/2$ resulting in grating lobes. For the MIMO configuration of FIGS. 7A and 7B, the 1D virtual receive sub-array 790 with $\lambda/2$ spacing mitigates the horizontal grating lobes of the 2D virtual receive subarray 780 and can also be used in a similar manner to improve upon the horizontal resolution and accuracy of the 2D array (see FIG. 7B). The 1D virtual receive array 760 can be used in a similar manner to further improve upon the horizontal resolution and accuracy.

The 1D horizontal virtual sub-array 790 with $\lambda/2$ spacing of FIG. 7B, can be oriented vertically if desired by orienting the transmit antennas 740 of FIG. 7A vertically. Alternatively, another set of transmit antennas similar to 740, but oriented vertically, can be added to the MIMO configuration of FIG. 7A to produce a 1D vertical virtual sub-array similar to 790 but oriented vertically.

For a given MIMO antenna configuration, it's known that interchanging the transmit antennas and the receive antennas will yield the same MIMO virtual receive array. For example, referring to FIGS. 5A and 5B, to synthesize the MIMO virtual receive array of FIG. 5B, the receive antennas $RX_1$ through $RX_N$ could instead be transmit antennas and the transmit antennas $TX_1$ through $TX_3$ could instead be receive antennas.

For a given MIMO antenna configuration, it's also know that the virtual receive array is determined by the relative location of the transmit antennas to each other and the relative location of the receive antennas to each other but not the relative location of the transmit antennas to the receive antennas. Hence the position of the set of transmit antennas relative to the position of the set of receive antennas can be adapted as needed to tailor the antenna board dimensions without affecting the resulting MIMO virtual receive array. For example, referring to FIG. 5, the set of three transmit antennas 510 can be relocated relative to the set of N receive antennas (520+530) without affecting the MIMO virtual receive array 540.

Note, it is known that the MIMO virtual receive array represents the far field response of the MIMO antenna layout. Although the far field response of the MIMO antenna layout is not affected by the relative position of the set of transmit antennas to the set of receive antennas, the near field response is affected and can be determined using ray tracing techniques for the specific layout of the transmit antennas and receive antennas.

The 2D MIMO configurations as depicted herein do not necessarily provide symmetrical angle capability in the horizontal and vertical directions. Depending on the application, it may be appropriate to provide asymmetrical angle capability, for example, better angle capability in the horizontal direction compared to the vertical direction. For the 2D MIMO configurations herein, angle capability in a given direction can be adapted by the variable parameters illustrated and/or by suitable orientation of the sets of transmit antennas and receive antennas.

In accordance with aspects of the present invention, FIGS. 9 through 16 illustrate additional exemplary 2D MIMO configurations with a specific number of transmit (TX) and receive (RX) antennas configured for different horizontal and vertical angle capabilities. An exemplary quantity of TX and RX antennas can vary from 12 TX×16 RX antennas to 24 TX×32 RX antennas with a corresponding quantity of virtual receive (Vrx) antennas from 192 to 768. For each configuration, the vertical angle capability can be tailored based on the vertical spacing parameter ΔV.

The above exemplary MIMO antenna configurations include eight exemplary configurations to yield a desired outcome. The quantity of TX, RX, and Vrx antennas involve tradeoffs in angle resolution versus the requirements imposed on the physical size of the antenna board as well as the requirements imposed on the radio frequency (RF) and digital signal processing components and the resulting cost implications.

Radar horizontal and vertical angle resolution determine the capability to distinguish (discriminate) multiple closely spaced objects and to image a single distributed object. Horizontal and vertical angle resolution are proportional to the azimuth and elevation beamwidths of the (virtual) receive array and can be further improved via angle super-resolution processing techniques. In the automotive radar frequency band of 77 GHz, the 2D MIMO configurations here-in can yield azimuth and elevation beamwidths from 5.0 to 1.5 deg. while incorporating from 3 TX×8 RX (24 Vrx) antennas to 12 TX×16 RX (192 Vrx) antennas. The corresponding physical size of the antenna board would vary from about 40 mm×40 mm to 100 mm×100 mm. The number of antennas is within the emerging capabilities of low-cost, single chip RFCMOS MMICs now being developed.

Automotive radar with azimuth and elevation beamwidth less than 1.5 deg. can be accomplished with 2D MIMO configurations here-in incorporating additional antennas, for example up to 24 TX×32 RX (768 Vrx), at the expense of increased physical size of the antenna board and increased cost of the supporting RF, analog and digital chipset (e.g., the need for multiple RFCMOS MMICs).

Angle resolution for the purposes of target imaging is typically on the order of the antenna beamwidth. Using super-resolution signal processing, angle resolution can be improved to on the order of one-half to one-third of the beamwidth. For adequate imaging capability for automotive radar, it is estimated that angle resolution on the order of one to two degrees is needed. For a given angle resolution metric, the radar image quality (object contour quality) will depend on the distribution of radar signal scattering in position and strength along the contour of the object.

Thus, embodiments of the present invention provide adequate accuracy and resolution capabilities necessary to support a variety of convenience and safety functions including full speed range adaptive cruise control, forward and side collision warning and avoidance, and automated parking as well as emerging autonomous driving functions including traffic jam pilot and highway pilot up to fully autonomous operation. As discussed herein, the exemplary embodiments incorporate MIMO configurations with uniform spacing of the virtual phase centers as well as sparse array MIMO configurations with non-uniform spacing of the virtual phase centers in both the horizontal and vertical dimensions.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A radar sensing system for a vehicle, the radar sensing system comprising:
a plurality of transmitters configured for installation and use on a vehicle, and operable to transmit radio signals;
a plurality of receivers configured for installation and use on the vehicle, and operable to receive radio signals which include transmitted radio signals reflected from objects in the environment; and
a plurality of receive antennas and a plurality of transmit antennas arranged in a selected antenna arrangement, wherein the selected antenna arrangement realizes a virtual receive array with virtual antennas spaced a half wavelength ($\lambda/2$) apart, wherein the selected antenna arrangement comprises transmit antennas and receive antennas with individual spacings greater than $\lambda/2$, wherein spacings between each transmit antenna of the plurality of transmit antennas are a uniform spacing of an integer multiple of $\lambda/2$, wherein spacings between each receive antenna of the plurality of receive antennas are a uniform spacing of a different integer multiple of $\lambda/2$, and wherein the wavelength is defined by the transmitted signal frequency.

2. The radar sensing system of claim 1, wherein the selected antenna arrangement is a multiple-input, multiple-output (MIMO) antenna configuration.

3. The radar sensing system of claim 1, wherein the selected antenna arrangement is a two-dimensional arrangement of antennas.

4. The radar sensing system of claim 1, wherein the selected antenna arrangement is chosen for a given quantity of receive antennas and a given quantity of transmit antennas for a given board size need.

5. The radar sensing system of claim 1, wherein the selected antenna arrangement is chosen for a given quantity of receive antennas and a given quantity of transmit antennas needed for a desired level of two-dimensional angle capability.

6. The radar sensing system of claim 1, wherein a portion of the transmit antennas are arranged into a linear array, and wherein the receive antennas are arranged into at least one linear array.

7. The radar sensing system of claim 6, wherein the at least one linear array of receive antennas comprises one of: (i) at least one horizontal array; (ii) at least one vertical array; and (iii) at least one horizontal array and at least one vertical array.

8. The radar sensing system of claim 1, wherein the selected antenna arrangement comprises at least two linear arrays of receive antennas, one disposed horizontally and one disposed vertically, wherein the selected antenna arrangement further comprises three transmit antennas arranged a distance from each other according to the length of the two linear arrays of receive antennas, and wherein dimensions of a resulting two-dimensional virtual receive array are at least twice the size of the dimensions of the selected receive antenna arrangement, such that an antenna board size is minimized and quantities of transmit antennas and receive antennas are also minimized.

9. The radar sensing system of claim 1, wherein the selected antenna arrangement comprises at least two linear arrays of receive antennas, one disposed horizontally and one disposed vertically, wherein the selected antenna arrangement further comprises three transmit antennas arranged a distance from each other according to the length of the two linear arrays of receive antennas, wherein the selected antenna arrangement further comprises at least one linear array of transmit antennas arranged an equidistance from each other and wherein the resulting virtual receive array includes a two-dimensional virtual receive array with dimensions at least twice the size of dimensions of the selected receive antenna arrangement and includes at least one one-dimensional virtual receive array with $\lambda/2$ spacing, such that an antenna board size is minimized and quantities of transmit antennas and receive antennas are also minimized.

10. The radar sensing system of claim 1, wherein the virtual receive sub-array comprises no grating lobes.

11. The radar sensing system of claim 1, wherein the uniform spacings of the transmit antennas and the receive antennas suppress grating lobes in the resulting virtual receive array.

12. The radar sensing system of claim 1, wherein the virtual receive array comprises one or more virtual antennas with non-uniform spacing greater than $\lambda/2$, and wherein the virtual receive array is modified according to one of: at least one of the one or more virtual antennas is discarded, and resulting holes produced through the non-uniform spacings are filled to extend the length of the portion of the virtual receive array with uniform spacing of virtual antennas via array interpolation techniques.

13. The radar sensing system of claim 1, wherein the plurality of receive antennas and the plurality of transmit antennas are swapped without changing the resulting virtual receive array.

14. A radar sensing system for a vehicle, the radar sensing system comprising:
a plurality of transmitters configured for installation and use on a vehicle, and operable to transmit radio signals;
a plurality of receivers configured for installation and use on the vehicle, and operable to receive radio signals which include transmitted radio signals reflected from objects in the environment; and
a two-dimensional (2D), multiple-input, multiple-output (MIMO) antenna configuration comprising a plurality of receive antennas and a plurality of transmit antennas, wherein the 2D MIMO antenna configuration realizes a virtual receive array with virtual antennas spaced a half wavelength ($\lambda/2$) apart, wherein at least a portion of the plurality of transmit antennas are arranged in a linear array, wherein each transmit antenna arranged in the linear array is uniformly spaced $\lambda/2$ apart, wherein the plurality of receive antennas are arranged into at least one linear array, wherein spacings between each of the plurality of receive antennas are a uniform spacing of a different integer multiple of $\lambda/2$, and wherein the wavelength is defined by the transmitted signal frequency.

15. The radar sensing system of claim 14, wherein the 2D MIMO configuration is a two-dimensional arrangement of antenna elements.

16. The radar sensing system of claim 14, wherein the 2D MIMO configuration is chosen for a given quantity of receive antennas and a given quantity of transmit antennas for a given board size need.

17. The radar sensing system of claim 14, wherein the 2D MIMO configuration is chosen for a given quantity of receive antennas and a given quantity of transmit antennas needed for a desired level of two-dimensional angle capability.

18. The radar sensing system of claim 17, wherein the receive antenna elements are arranged into at least two linear arrays.

19. The radar sensing system of claim 18, wherein the virtual receive array comprises at least one virtual receive sub-array comprising no grating lobes.

20. The radar sensing system of claim 18, wherein the uniform spacings of the transmit antennas and the receive antennas suppress grating lobes in the resulting at least one virtual receive sub-array.

21. The radar sensing system of claim 18, wherein the at least one virtual receive sub-array comprises one or more virtual antennas with non-uniform spacing greater than $\lambda/2$, and wherein the at least one virtual receive sub-array is modified according to one of: at least one of the one or more virtual antennas is discarded, and resulting holes produced through the non-uniform spacings are filled to extend the length of the portion of the virtual receive sub-array with uniform spacing of virtual antennas via array interpolation techniques.

22. The radar sensing system of claim 18, wherein the 2D MIMO configuration comprises three transmit antennas arranged an equidistance from each other.

23. A method for selecting a two-dimensional angle capability of a radar for a vehicle, the method comprising:
providing a radar system comprising (i) a plurality of transmitters configured for installation and use on a vehicle, and operable to transmit radio signals, (ii) a plurality of receivers configured for installation and use on the vehicle, and operable to receive radio signals which include transmitted radio signals reflected from objects in the environment, and (iii) a plurality of receive antennas and a plurality of transmit antennas; and
selecting an antenna arrangement for the plurality of receive antennas and the plurality of transmit antennas, wherein the selected antenna arrangement realizes a virtual receive sub-array with virtual antennas spaced a half wavelength ($\lambda/2$) apart, wherein the selected antenna arrangement comprises transmit antennas and receive antennas with individual spacings greater than $\lambda/2$, wherein spacings between each of the plurality of transmit antennas are a uniform spacing of an integer multiple of $\lambda/2$, wherein spacings between each of the plurality of receive antennas are a uniform spacing of a different integer multiple of λ/2, and wherein the wavelength is defined by the transmitted signal frequency.

24. The method of claim 23, wherein selecting an antenna arrangement comprises selecting an antenna arrangement for a given quantity of receive antennas and a given quantity of transmit antennas for a given board size.

25. The method of claim 23, wherein selecting an antenna arrangement comprises selecting an antenna arrangement for a given quantity of receive antennas and a given quantity of transmit antennas for a desired level of two-dimensional angle capability.

26. The method of claim 23, wherein selecting an antenna arrangement comprises selecting an antenna arrangement such that the virtual receive sub-array comprises no grating lobes.

27. The method of claim 26, wherein uniform spacings of the transmit antennas and the receive antennas suppress grating lobes in the resulting virtual receive sub-array.

28. The method of claim 26, wherein the virtual receive sub-array comprises one or more virtual antennas with non-uniform spacing greater than λ/2.

29. The method of claim 28 further comprising modifying the virtual receive sub-array according to one of (i) discarding at least one or more virtual antennas and (ii) filling resulting holes produced through the non-uniform spacings to extend the length of the portion of the virtual receive sub-array with uniform spacing of virtual antennas via array interpolation techniques.

* * * * *